US012578913B2

(12) United States Patent
Li et al.

(10) Patent No.:  US 12,578,913 B2
(45) Date of Patent:     Mar. 17, 2026

(54) DISPLAY METHOD, ELECTRONIC DEVICE, AND SYSTEM

(71) Applicant: HUAWEI TECHNOLOGIES CO., LTD., Guangdong (CN)

(72) Inventors: Jie Li, Shenzhen (CN); Min Liu, Nanjing (CN); Xilin Sun, Shenzhen (CN); Yinzhu Cheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 18/284,138

(22) PCT Filed: Mar. 29, 2022

(86) PCT No.: PCT/CN2022/083727

§ 371 (c)(1),
(2) Date: Sep. 26, 2023

(87) PCT Pub. No.: WO2022/206763

PCT Pub. Date: Oct. 6, 2022

(65) Prior Publication Data

US 2024/0303024 A1     Sep. 12, 2024

(30) Foreign Application Priority Data

Mar. 31, 2021     (CN) .......................... 202110350080.3
Apr. 30, 2021     (CN) .......................... 202110484031.9

(51) Int. Cl.
*G06F 3/14*          (2006.01)
*H04M 1/72436*     (2021.01)
*G09G 5/14*          (2006.01)

(52) U.S. Cl.
CPC .......... *G06F 3/1454* (2013.01); *G06F 3/1423* (2013.01); *H04M 1/72436* (2021.01);
(Continued)

(58) Field of Classification Search
None
See application file for complete search history.

(56) References Cited

U.S. PATENT DOCUMENTS 9,847,999 B2 * 12/2017  Van Os ................... G06F 21/10
11,397,956 B1 * 7/2022  Eidam ................. G06F 3/04883
(Continued)

FOREIGN PATENT DOCUMENTS

CN          103744810 A      4/2014
CN          105589506 A      5/2016
(Continued)

*Primary Examiner* — Parul H Gupta
(74) *Attorney, Agent, or Firm* — WOMBLE BOND DICKINSON (US) LLP

(57)          ABSTRACT

The method includes: In response to receiving a first indication, a first electronic device displays a first interface and sends first information to a second electronic device, where the first information includes one or more interface elements on the first interface and label information of the one or more interface elements. The second electronic device displays a second interface based on the label information of the one or more interface elements in response to receiving the first information, where the second interface displays at least part of the one or more interface elements.

20 Claims, 18 Drawing Sheets

(52) U.S. Cl.
CPC ........... *G09G 5/14* (2013.01); *G09G 2354/00*
(2013.01); *G09G 2370/16* (2013.01)

(56)                    References Cited

U.S. PATENT DOCUMENTS

| | | | |
|---|---|---|---|
| 2005/0010418 A1* | 1/2005 | McNair | G10L 15/26 |
| | | | 704/E15.045 |
| 2014/0068520 A1* | 3/2014 | Missig | G06F 3/04883 |
| | | | 715/841 |
| 2015/0188776 A1* | 7/2015 | Lee | G08C 17/02 |
| | | | 715/736 |
| 2015/0293746 A1* | 10/2015 | Tsern | G06F 3/1454 |
| | | | 715/728 |
| 2016/0182603 A1* | 6/2016 | Chung | H04L 67/025 |
| | | | 715/740 |
| 2016/0283063 A1* | 9/2016 | Missig | G06F 3/1423 |
| 2017/0060518 A1* | 3/2017 | Hong | G06F 3/0482 |
| 2018/0253148 A1* | 9/2018 | Santamaria | G01C 21/362 |
| 2019/0235707 A1* | 8/2019 | Missig | G06F 3/1438 |
| 2021/0027747 A1* | 1/2021 | McRae | G09G 5/12 |
| 2021/0219118 A1* | 7/2021 | Chen | H04N 21/4436 |
| 2023/0273812 A1* | 8/2023 | Bian | G06F 9/4862 |
| | | | 709/202 |

FOREIGN PATENT DOCUMENTS

| | | |
|---|---|---|
| CN | 106843661 A | 6/2017 |
| CN | 111666119 A | 9/2020 |

* cited by examiner

Electronic device
100

Antenna 1                                    Antenna 2

| Area 801 | Area 802 | | | | |
|---|---|---|---|---|---|
| | Area 803 | | | | |
| | Area 804 | | | | |
| | Area 805 | Area 806 | Area 807 | Area 808 | |

Electronic device 1300

DISPLAY METHOD, ELECTRONIC DEVICE, AND SYSTEM

This application is a national stage of International Application No. PCT/CN2022/083727, filed on Mar. 29, 2022, which claims priority to Chinese Patent Application No. 202110484031.9, filed on Apr. 30, 2021 and Chinese Patent Application No. 202110350080.3, filed on Mar. 31, 2021. All the aforementioned applications are hereby incorporated by reference in their entireties.

TECHNICAL FIELD

This application relates to the terminal field, and more ally, to a display method, an electronic device, and a system.

BACKGROUND

Currently, a technology used for restoring a user interface (UI) between devices is mainly a video projection restoration technology (for example, Miracast). The basic principle is to encode a picture of a source device into a video and play the video on a client device (sink device), so that the client device restores a user interface of the source device. This type of UI restoration technology requires a capability (for example, a video decoding capability) of the client device, and cannot be used on a device without the video decoding capability.

SUMMARY

Embodiments of this application provide a display method, an electronic device, and a system. A source device adds label information to an interface element on a user interface, and a client device may restore a user interface suitable for the client device based on the label information of the interface element without relying on a video decoding capability of the client device.

According to a first aspect, a system is provided. The system includes a first electronic device and a second electronic device, and the first electronic device communicates with the second electronic device through a short-range wireless connection. The first electronic device is configured to: in response to receiving a first indication, display a first interface and send first information to the second electronic device, where the first information includes one or more interface elements on the first interface and label information of the one or more interface elements. The second electronic device is configured to display a second interface based on the label information of the one or more interface elements in response to receiving the first information, where the second interface displays at least part of the one or more interface elements.

In an embodiment of the application, after receiving the first indication, the first electronic device (a source device) may send the one or more interface elements on the first interface and the label information of the one or more interface elements to the second electronic device (a client device), so that the second electronic device can restore, based on the label information, an interface suitable for the second electronic device, and a user can experience different interface styles on different devices. This helps improve user experience. In addition, the first electronic device does not need to rely on a video coding capability of the first electronic device when sending the interface element and the label information of the interface element, and the second electronic device does not need to rely on a video decoding capability of the second electronic device when restoring the interface.

In an embodiment, each of the one or more interface elements in the first information corresponds to label information of each interface element.

In an embodiment, the first electronic device is further configured to: before sending the first information to the second electronic device, obtain a plurality of interface elements on the first interface, and add label information to the plurality of interface elements with.

In an embodiment, the label information may be a name of an interface element.

With reference to the first aspect, in an embodiment of the first aspect, the second electronic device is configured to display the second interface based on the label information of the one or more interface elements and a first mapping relationship, where the first mapping relationship is a mapping relationship between display areas of the at least part of the interface elements and label information of the at least part of the interface elements.

In an embodiment, the first electronic device stores the first mapping relationship. When receiving the first indication, the first electronic device may send the first mapping relationship to the second electronic device in addition to sending the interface element and the label information of the interface element to the second electronic device.

In an embodiment, the first electronic device may store a plurality of mapping relationships in a same scenario. For example, when the first electronic device (for example, a mobile phone) sends the first mapping relationship to the second electronic device (for example, a notebook computer), the first electronic device (for example, the mobile phone) may send a second mapping relationship to a third electronic device (for example, a smartwatch).

In an embodiment, the second electronic device may store the first mapping relationship. When receiving the interface element and the label information sent by the first electronic device, the second electronic device may display the second interface based on the first mapping relationship.

In an embodiment of the application, different client devices may restore different display interfaces based on different mapping relationships. For example, the notebook computer and the smartwatch may restore display interfaces of different styles in a same scenario. In this way, the user can experience different interface styles on different types of devices. This helps improve user experience.

With reference to the first aspect, in an embodiment of the first aspect, the first electronic device is configured to: in response to detecting an operation of starting a first application program by the user, display the first interface, and send the first information to the second electronic device.

In an embodiment of the application, when the first electronic device detects the operation of starting the first application program by the user, the first electronic device may display a display interface of the first application program and send the interface element and the label information of the interface element on the display interface to the second electronic device, and the display interface of the first application program on the second electronic device can be restored without performing another complex operation by the user. This helps improve user experience.

With reference to the first aspect, in an embodiment of the first aspect, the first electronic device is configured to: in response to detecting the operation of starting the first application program by the user, display the first interface and prompt the user whether to send the one or more interface elements on the first interface to the second electronic device for display; and in response to detecting an operation of determining to send the one or more interface elements on the first interface to the second electronic device by the user for display, send the first information to the second electronic device.

In an embodiment of the application, when detecting that the user starts the first application program, the first electronic device may further prompt the user whether to send the interface element to the second electronic device for display, so that the user can determine a device on which the interface of the first application program needs to be displayed.

With reference to the first aspect, in an embodiment of the first aspect, the first electronic device is further configured to: in response to detecting the operation of starting the first application program by the user, display the first interface and send first indication information to the second electronic device, where the first indication information indicates that the first electronic device has started the first application program. The second electronic device is further configured to: in response to receiving the first indication information, prompt the user whether to display the display interface of the first application program by using the second electronic device. The second electronic device is further configured to send first request information to the first electronic device in response to detecting an operation of determining to display the display interface of the first application program by the user by using the second electronic device, where the first request information requests to display an interface element on the first interface. The first electronic device is configured to send the first information to the second electronic device in response to receiving the first request information.

In an embodiment of the application, when starting the first application program, the first electronic device may indicate to the second electronic device that the first electronic device has started the first application program. The second electronic device may prompt the user whether to display the display interface of the first application program on the second electronic device. This helps the user to determine a device on which the interface of the first application program needs to be displayed.

With reference to the first aspect, in an embodiment of the first aspect, the second electronic device is further configured to send second request information to the first electronic device in response to detecting an operation of a user, where the second request information requests to display an interface element on the first interface. The first electronic device is configured to: in response to receiving the second request information sent by the second electronic device, display the first interface and send the first information to the second electronic device.

In an embodiment of the application, when the second electronic device detects the operation of the user, the second electronic device may determine that a current focus of the user is on the second electronic device. In this way, the second electronic device may request an interface element on the first interface from the first electronic device, to restore the display interface on the first electronic device.

In an embodiment, the operation of the user may be an operation of moving or clicking a mouse by the user, or the operation of the user may be an operation of clicking a physical key on a keyboard by the user.

In an embodiment, the operation of the user may be an operation of tapping an icon associated with the first application program by the user.

With reference to the first aspect, in an embodiment of the first aspect, the first electronic device is further configured to: before sending the first information to the second electronic device, determine that a distance between the first electronic device and the second electronic device is less than or equal to a preset distance.

With reference to the first aspect, in an embodiment of the first aspect, the at least part of the interface elements include a first interface element, and the first electronic device is further configured to send second information to the second electronic device in response to an update of the first interface element, where the second information includes the updated first interface element and label information of the first interface element. The second electronic device is further configured to display the updated first interface element on the second interface in response to receiving the second information.

In an embodiment of the application, after detecting that the first interface element is updated, the first electronic device may send the updated first interface element to the second electronic device in real time for display, to ensure that interface elements displayed on the first electronic device and the second electronic device can be synchronized.

In an embodiment, if the first interface is a video playback interface, the first interface element may be a video playback progress bar or image information in a video display window.

In an embodiment, if the first interface is a music playback interface, the first interface element may be lyric information corresponding to an audio that is being played.

In an embodiment, if the first interface element changes in real time, the first electronic device may send the first interface element to the second electronic device based on a specified period.

With reference to the first aspect, in an embodiment of the first aspect, the at least some interface elements include a second interface element. The second electronic device is further configured to send second indication information to the first electronic device in response to detecting an input of the user on the second interface element, where the second indication information indicates that the second electronic device detects the input of the user on the second interface element. The first electronic device is further configured to perform an operation for the input in response to receiving the second indication information.

In an embodiment of the application, when detecting the input of the user on the second interface element, the second electronic device may indicate to the first electronic device that the second electronic device detects the input of the user on the second interface element, so that the first electronic device can perform a corresponding operation.

For example, the second interface element is a download control. When the second electronic device detects a tap event of the user on the download control, the second electronic device may indicate to the first electronic device that the second electronic device detects the tap event of the user on the download control. After receiving the indication, the first electronic device may complete downloading of a file (a song, a document, a video, or the like) in a background of the first electronic device.

With reference to the first aspect, in an embodiment of the first aspect, the first electronic device is further configured to update a third interface element in response to performing the operation, where the at least part of the interface elements include the third interface element. The first electronic device is further configured to send third information to the second electronic device, where the third information includes the updated third interface element and label information of the third interface element. The second electronic device is further configured to display the updated third interface element on the second interface in response to receiving the third information.

In an embodiment of the application, if the third interface element is updated or a new interface element is added to the first interface after the first electronic device performs a corresponding operation, the first electronic device may send information about the updated third interface element or the newly added interface element to the second electronic device for display, to ensure that interface elements displayed on the first electronic device and the second electronic device can be synchronized.

With reference to the first aspect, in an embodiment of the first aspect, the first information further includes information about a scenario corresponding to the first interface.

According to a second aspect, a display method is provided. The method is applied to a first electronic device, and the first electronic device communicates with a second electronic device through a short-range wireless connection. The method includes: The first electronic device receives a first indication; and the first electronic device displays a first interface in response to receiving the first indication and sends first information to the second electronic device, where the first information includes one or more interface elements on the first interface and label information of the one or more interface elements.

With reference to the second aspect, in an embodiment of the second aspect, the method further includes: The first electronic device sends information about a first mapping relationship to the second electronic device, where the first mapping relationship is a mapping relationship between a display area of an interface element and label information of the interface element.

With reference to the second aspect, in an embodiment of the second aspect, that the first electronic device receives a first indication includes: The first electronic device detects an operation of starting a first application program by a user.

With reference to the second aspect, in an embodiment of the second aspect, that the first electronic device displays the first interface in response to receiving the first indication and sends the first information to the second electronic device includes: in response to detecting the operation of starting the first application program by the user, displaying the first interface and prompt the user whether to send the one or more interface elements on the first interface to the second electronic device for display; and in response to detecting an operation of determining to send the one or more interface elements on the first interface to the second electronic device by the user for display, sending the first information to the second electronic device.

With reference to the second aspect, in an embodiment of the second aspect, that the first electronic device sends the first information to the second electronic device in response to receiving the first indication includes: The first electronic device receives first request information sent by the second electronic device, where the first request information requests to display an interface element on the first interface; and the first electronic device sends the first information to the second electronic device in response to receiving the first request information.

With reference to the second aspect, in an embodiment of the second aspect, the method further includes: Before sending the first information to the second electronic device, the first electronic device determines that a distance between the first electronic device and the second electronic device is less than or equal to a preset distance.

With reference to the second aspect, in an embodiment of the second aspect, the one or more interface elements include a first interface element, and the method further includes: The first electronic device sends second information to the second electronic device in response to an update of the first interface element, where the second information includes the updated first interface element and label information of the first interface element.

With reference to the second aspect, in an embodiment of the second aspect, the one or more interface elements include a second interface element, and the method further includes: The first electronic device receives second indication information sent by the second electronic device, where the second indication information indicates that the second electronic device detects an input of the user on the second interface element. The first electronic device performs an operation for the input in response to receiving the second indication information.

With reference to the second aspect, in an embodiment of the second aspect, the method further includes: The first electronic device updates a third interface element in response to performing the operation, where the one or more interface elements include the third interface element. The first electronic device sends third information to the second electronic device, where the third information includes the updated third interface element and label information of the third interface element.

According to a third aspect, a display method is provided. The method is applied to a second electronic device, and the second electronic device communicates with a first electronic device through a short-range wireless connection. The method includes: The second electronic device receives first information sent by the first electronic device, where the first information includes one or more interface elements on a first interface displayed by the first electronic device and label information of the one or more interface elements. The second electronic device displays a second interface based on the label information of the one or more interface elements in response to receiving the label information, where the second interface displays at least part of the one or more interface elements.

With reference to the third aspect, in an embodiment of the third aspect, that the second electronic device displays a second interface based on the label information of the one or more interface elements includes: The second electronic device displays the second interface based on the label information of the one or more interface elements and a first mapping relationship, where the first mapping relationship is a mapping relationship between display areas of the at least part of the interface elements and label information of the at least part of the interface elements.

With reference to the third aspect, in an embodiment of the third aspect, before the second electronic device receives the first information sent by the first electronic device, the method further includes: The second electronic device receives first indication information sent by the first electronic device, where the first indication information indicates that the first electronic device has started a first application program. In response to receiving the first indication information, the second electronic device prompts a user whether to display a display interface of the first application program by using the second electronic device. The second electronic device sends first request information to the first electronic device in response to detecting an operation of determining to display the display interface of the first application program by the user by using the second electronic device, where the first request information requests to display an interface element on the first interface.

With reference to the third aspect, in an embodiment of the third aspect, before the second electronic device receives the first information sent by the first electronic device, the method further includes: The second electronic device sends second request information to the first electronic device in response to detecting an operation of a user, where the second request information requests to display an interface element on the first interface.

With reference to the third aspect, in an embodiment of the third aspect, the at least part of the interface elements include a first interface element, and the method further includes: The second electronic device receives second information sent by the first electronic device, where the second information includes the updated first interface element and label information of the first interface element. The second electronic device displays the updated first interface element on the second interface in response to receiving the second information.

With reference to the third aspect, in an embodiment of the third aspect, the at least part of the interface elements include a second interface element, and the second electronic device sends second indication information to the first electronic device in response to detecting an input of the user on the second interface element, where the second indication information indicates that the second electronic device detects the input of the user on the second interface element.

With reference to the third aspect, in an embodiment of the third aspect, the at least part of the interface elements include a third interface element, and the method further includes: If the first electronic device updates the third interface element after receiving the second indication information, the second electronic device receives third information sent by the first electronic device, where the third information includes the updated third interface element and label information of the third interface element. The third electronic device displays the updated third interface element on the second interface in response to receiving the third information.

According to a fourth aspect, an apparatus is provided. The apparatus includes: a receiving unit, configured to receive a first indication; a display unit, configured to display a first interface in response to receiving the first indication; and a sending unit, configured to send first information to a second electronic device, where the first information includes one or more interface elements on the first interface and label information of the one or more interface elements.

According to a fifth aspect, an apparatus is provided. The apparatus includes: a receiving unit, configured to receive first information sent by a first electronic device, where the first information includes one or more interface elements on a first interface displayed by the first electronic device and label information of the one or more interface elements; and a display unit, configured to display a second interface based on the label information of the one or more interface elements in response to receiving the label information, where the second interface displays at least part of the one or more interface elements.

According to a sixth aspect, an electronic device is provided, including one or more processors, a memory, and one or more computer programs. The one or more computer programs are stored in the memory. The one or more computer programs include instructions. When the instructions are executed by the electronic device, the electronic device is enabled to perform the method in any possible implementation of the second aspect.

According to a seventh aspect, an electronic device is provided, including one or more processors, a memory, and one or more computer programs. The one or more computer programs are stored in the memory. The one or more computer programs include instructions. When the instructions are executed by the electronic device, the electronic device is enabled to perform the method in any possible implementation of the third aspect.

According to an eighth aspect, a computer program product including instructions is provided. When the computer program product runs on a first electronic device, the electronic device is enabled to perform the method according to the second aspect; or when the computer program product runs on a second electronic device, the electronic device is enabled to perform the method according to the third aspect.

According to a ninth aspect, a computer-readable storage medium is provided, including instructions. When the instructions are run on a first electronic device, the electronic device is enabled to perform the method according to the second aspect; or when the instructions are run on a second electronic device, the electronic device is enabled to perform the method according to the third aspect.

According to a tenth aspect, a chip is provided, configured to execute instructions. When the chip runs, the chip performs the method according to the second aspect; or the chip performs the method according to the third aspect.

DESCRIPTION OF EMBODIMENTS

The following describes technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of embodiments of this application, "a plurality of" means two or more than two.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the description of embodiments, "a plurality of" means two or more unless otherwise specified.

A method provided in embodiments of this application may be applied to an electronic device such as a mobile phone, a tablet computer, a wearable device, an in-vehicle device, an augmented reality (AR) device/a virtual reality (VR) device, a notebook computer, an ultra-mobile personal computer (UMPC), a netbook, or a personal digital assistant (PDA). A type of the electronic device is not limited in embodiments of this application.

Figure 1:
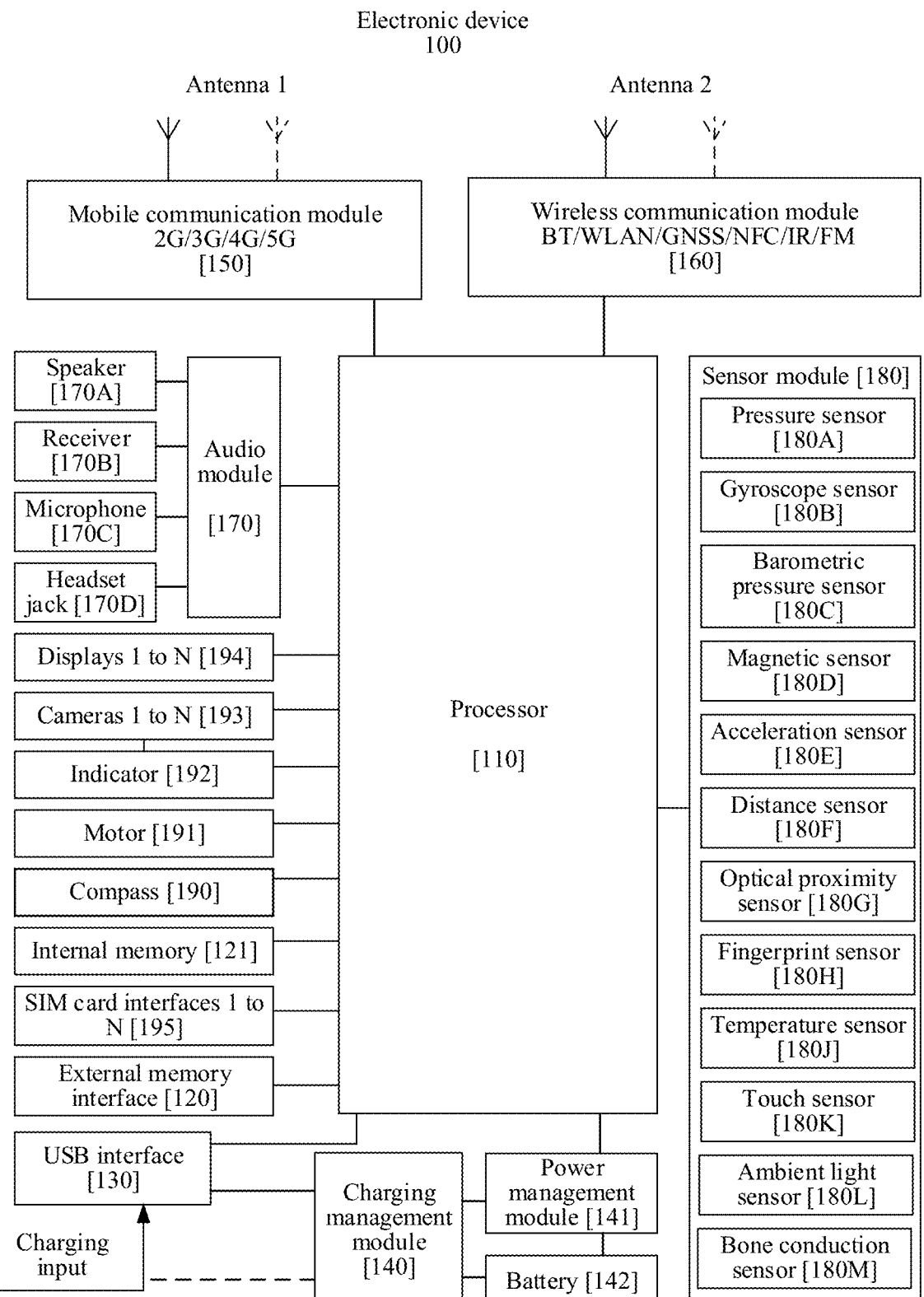
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headsetjack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in an embodiment of the application does not constitute a limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus that includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules shown in an embodiment of the application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG) 1, MPEG 2, MPEG 3, and MPEG 4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion sensing game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively be in contact with a body pulse to receive a blood pressure beating signal. In some embodiments, the bone conduction sensor 180M may alternatively be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an embedded SIM (eSIM) card, that is, an embedded SIM card. The eSIM card may be embedded into the electronic device 100, and cannot be separated from the electronic device 100.

It should be understood that a calling card in embodiments of this application includes but is not limited to a SIM card, an eSIM card, a universal subscriber identity module (USIM), a universal integrated circuit card (UICC), and the like.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 2:
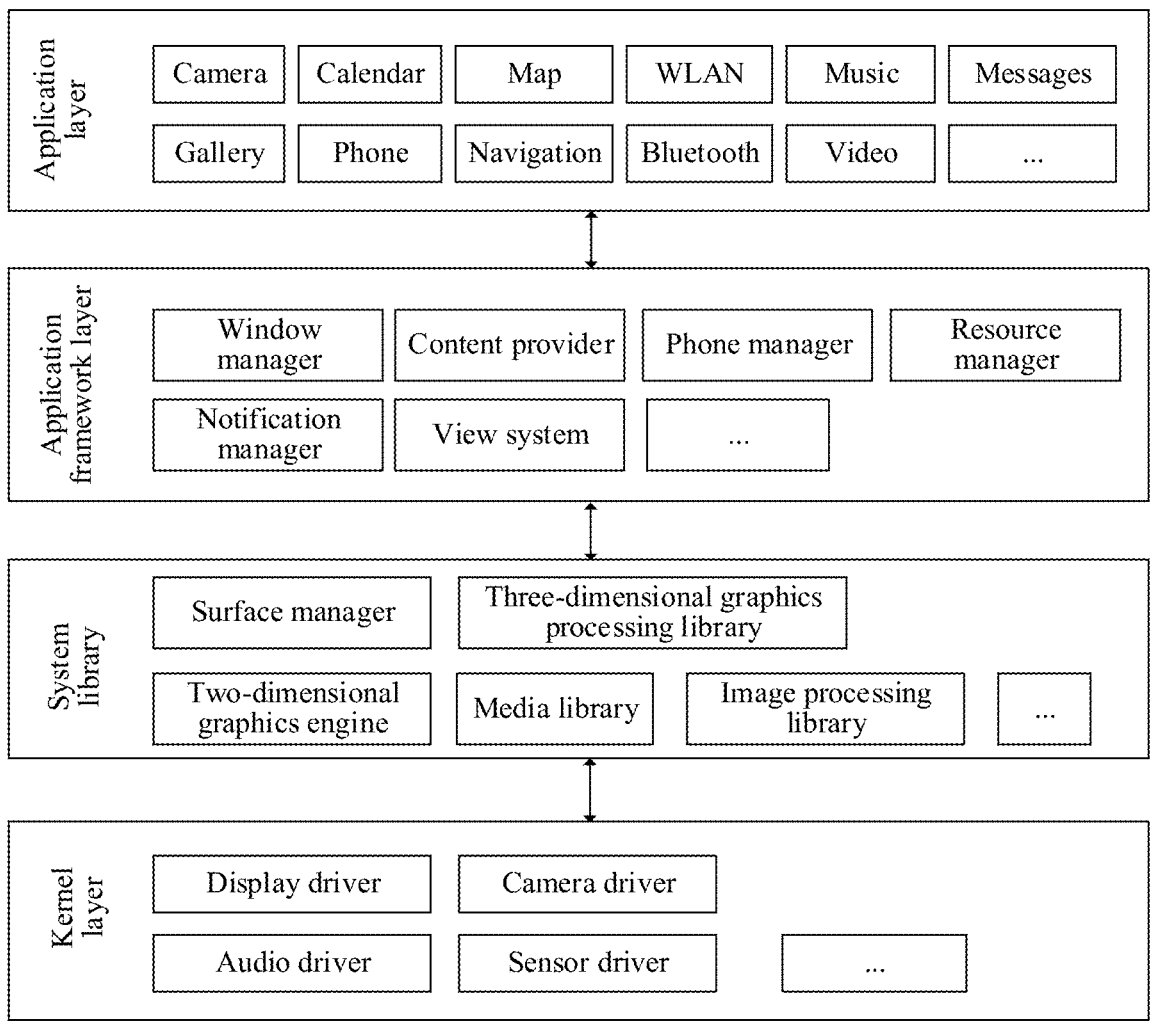
FIG. 2 is a block diagram of a software structure according to an embodiment of this application.

FIG. 2 is a block diagram of the software structure of the electronic device 100 in an embodiment of the application. In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be understood that the technical solutions in embodiments of this application may be applied to systems such as Android, iOS, and HarmonyOS.

Figure 3A:
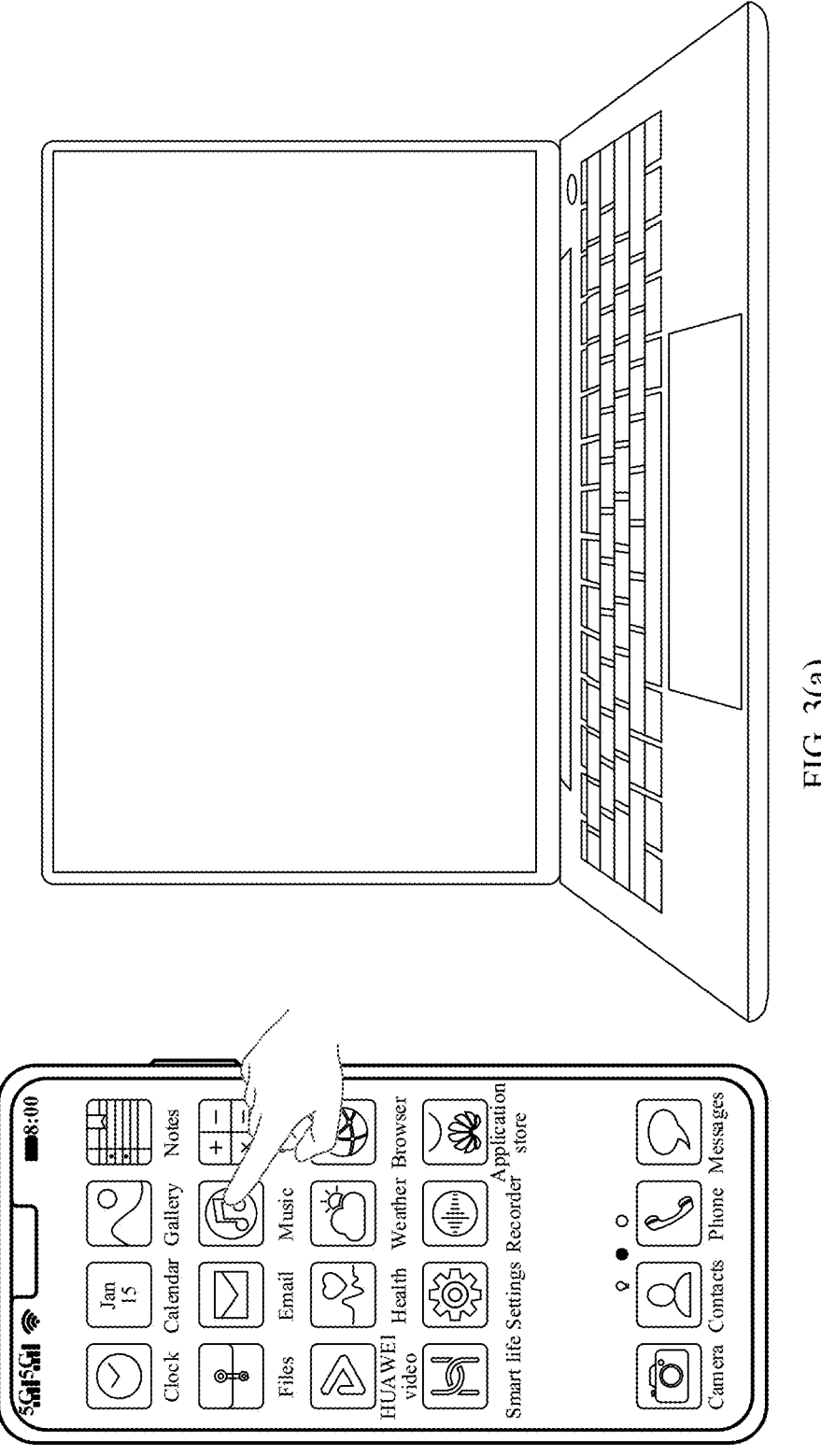
FIG. 3(a) and FIG. 3(b) each show a set of graphical user interfaces according to an embodiment of this application.
Figure 3B:
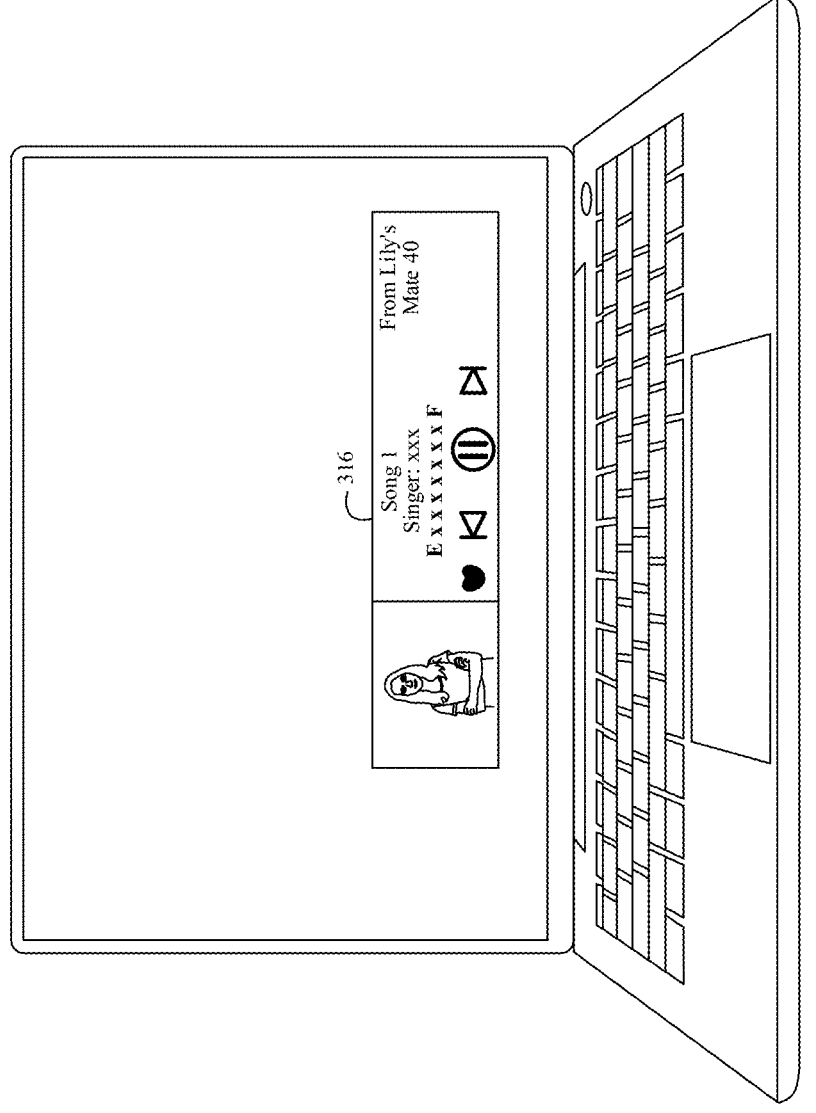
Figure 3B:
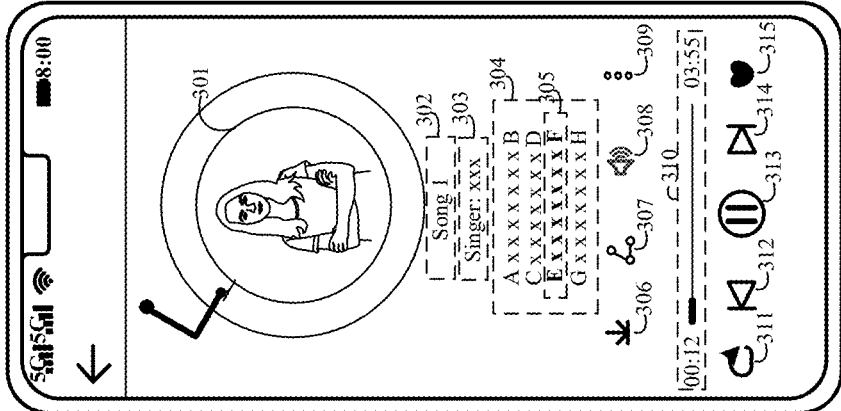

FIG. 3(*a*) and FIG. 3(*b*) each show a group of graphical user interfaces (GUIs) according to an embodiment of this application.

As shown in FIG. 3(*a*), a mobile phone displays a desktop of the mobile phone. A notebook computer is located near the mobile phone, and the notebook computer may display a desktop of the notebook computer.

When the notebook computer is close to the mobile phone, the mobile phone and the notebook computer may be networked in a near field wireless connection manner. Networking modes include but are not limited to access point (AP) networking and peer-to-peer (P2P) networking. In AP networking, devices in a same AP (for example, a home Wi-Fi router) can communicate with each other through an AP device, to form many-to-many networking. For example, the mobile phone and the notebook computer may be in a same home router. When the notebook computer is close to the mobile phone, the mobile phone may use a received signal strength indication (RSSI) technology to calculate a distance between the mobile phone and the notebook computer based on strength of a received signal. When the distance is less than or equal to a preset distance, the mobile phone and the notebook computer may perform AP networking.

Wi-Fi direct, also referred to as Wi-Fi peer to peer (Wi-Fi P2P), is a peer-to-peer connection manner, and enables a plurality of Wi-Fi devices to form a peer-to-peer network (P2P network) without an access point (AP) to communicate with each other. One station (STA) may function as a conventional AP, and is referred to as a group owner (GO). Another STA may be referred to as a group client (GC), and the GC may be connected to the GO like the AP. One STA may play a role of the GO (that is, act as an AP), and another STA may play a role of the GC. In an embodiment of the application, when a device is close to another device, a device on a left side may be considered as the GO, and a device on a right side may be considered as the GC by default. For example, the mobile phone may be used as the GO, and the notebook computer may be used as the GC. Alternatively, when a device detects an operation of sliding right performed by a user, the device may be used as the GC, and the device may select another device on a left side of the device as the GO; or when a device detects an operation of sliding left performed by a user, the device may be used as the GC, and the device may select another device on a right side of the device as the GO.

To construct a P2P network, an electronic device needs to scan another electronic device according to a P2P protocol. This process is referred to as a discovery phase. After the discovery, establishment of a P2P connection can be triggered. When the notebook computer is close to the mobile phone, the mobile phone may use the RSSI technology to calculate a distance between the mobile phone and the notebook computer based on an RSSI. When the distance is less than or equal to a preset distance, the mobile phone and the notebook computer may perform P2P networking.

The Wi-Fi P2P technology is the basis of upper-layer services. Currently, P2P applications established on P2P include Miracast and WLAN Direct. In a Miracast application scenario, an electronic device that supports P2P may discover and connect to a large-screen device that supports P2P through scanning, and then directly send resources such as a video and a picture of the electronic device to the large-screen device for display. The P2P technology greatly enriches Wi-Fi experience.

When detecting that the user taps an icon of a music application, the mobile phone and the notebook computer each may display a GUI shown in FIG. 3(*b*).

As shown in FIG. 3(*b*), in response to detecting an operation of tapping the icon of the music application by the user, the mobile phone may display a music playback interface, where the music playback interface includes a plurality of interface elements, for example, a cover picture 301 of a music album, a song name 302 (for example, Song 1), a singer name 303, a lyric display area 304, and a lyric 305 that is being played (where for example, a lyric played from 00:12 to 00:15 is "ExxxxxxF"), a download control 306, a sharing control 307, a volume adjustment control 308, a more-function selection control 309, a song playback progress bar 310, a mode selection control 311 (where the mode selection control may be used to select a mode such as sequential play, single loop, or random play), a control 312 for playing a previous song, a pause/start control 313, a control 314 for playing a next song, and a like control 315.

In an embodiment, when the mobile phone determines that the distance between the notebook computer and the mobile phone is less than or equal to the preset distance, the mobile phone may send information about a plurality of interface elements on a currently displayed music playback interface and audio content of a song to the notebook computer. As shown in FIG. 3(*b*), in response to receiving the information that is about the plurality of interface elements and that is sent by the mobile phone, the notebook computer may display a music playback window 316. The music playback window 316 includes the cover picture 301 of the music album, the song name 302, the singer name 303, the lyric 305 that is being played, the like control 315, the control 312 for playing the previous song, the pause/start control 313, and the control 314 for playing the next song.

In an embodiment, the mobile phone, the notebook computer, and a smartwatch are networked. When detecting that the user taps the icon of the music application, the mobile phone may compare the distance between the mobile phone and the notebook computer and a distance between the mobile phone and the smartwatch. When the distance between the mobile phone and the notebook computer is less than the distance between the mobile phone and the smartwatch, the mobile phone may send information about a plurality of interface elements on a currently displayed music playback interface and audio content of a song to the notebook computer.

In an embodiment, when the mobile phone detects that the user starts the music application, if the mobile phone has been networked with the notebook computer, the mobile phone may prompt the user whether to send a display interface of the music application to the notebook computer. When detecting an operation of determining to send the display interface of the music application to the notebook computer by the user, the mobile phone may send information about a plurality of interface elements on a currently displayed music playback interface and audio content of a song to the notebook computer.

In an embodiment, if the mobile phone, the notebook computer, and a smartwatch are networked, the mobile phone may prompt the user to send a display interface of the music application to the notebook computer or the smart watch. For example, in response to detecting an operation of determining to send the display interface of the music application to the notebook computer by the user, the mobile phone may send information about a plurality of interface elements on a currently displayed music playback interface and audio content of a song to the notebook computer. For another example, in response to detecting an operation of determining to send the display interface of the music application to the smartwatch by the user, the mobile phone may send information about a plurality of interface elements on a currently displayed music playback interface and audio content of a song to the smartwatch.

In an embodiment, an icon associated with the music application may be displayed on a display interface of the notebook computer. When detecting an operation of tapping the icon by the user, the notebook computer may send request information to the mobile phone, where the request information requests the mobile phone to send information about a plurality of interface elements on a music playback interface and audio content of a song to the notebook computer.

In an embodiment, when detecting a first operation of the user (for example, clicking a mouse or clicking a key on a keyboard), the notebook computer may send indication information to the mobile phone, where the indication information indicates that the notebook computer detects the first operation of the user. In response to receiving the indication information and a fact that the mobile phone is displaying a music playback interface, the mobile phone may send information about a plurality of interface elements and audio content of a song to the notebook computer.

In an embodiment, the mobile phone may further send a device name (for example, Mate 40) and a user name (for example, Lily) of the mobile phone to the notebook computer. The notebook computer may further prompt, on the music playback window 316, the user that the music playback interface is from Lily's Mate 40.

In an embodiment, when sending the information about the plurality of interface elements and the audio content to the notebook computer, the mobile phone may continue to display the music playback interface, and the mobile phone may not play the audio content of the song.

In an embodiment of the application, the mobile phone may extend a plurality of interface elements on a display interface of a running application program to the notebook computer, so that the user can view, on the notebook computer, the display interface of the application program on the mobile phone. This helps improve user experience. In addition, a music playback interface displayed on the notebook computer is different from the music playback interface on the mobile phone. The music playback interface displayed on the notebook computer is more suitable for a playback style of the notebook computer, so that the user can experience, on different devices, a display manner suitable for a current device.

FIG. 4 (*a*) to FIG. 4(*e*) each show a group of GUIs according to an embodiment of this application.

As shown in FIG. 4(*a*), a mobile phone displays a desktop of the mobile phone. A notebook computer is located near the mobile phone, and the notebook computer may display a desktop of the notebook computer. When detecting that a user taps an icon of a social application, the mobile phone and the notebook computer each may display a GUI shown in FIG. 4(*b*).

It should be understood that when a distance between the mobile phone and the notebook computer is less than or equal to a preset distance, the mobile phone and the notebook computer may be networked. For a networking process, refer to the descriptions in the foregoing embodiment. Details are not described herein again.

As shown in FIG. 4(*b*), in response to detecting an operation of tapping the icon of the social application by the user, the mobile phone may display a home page of the social application. The home page of the social application includes a plurality of interface elements, for example, chat records 400 between the user and a contact father, chat records 405 between the user and a contact mother, chat records 406 between the user and a contact Sam, and chat records 407 between the user and a contact Lucy. The chat records 400 between the user and the contact father are used as an example. The chat records include profile picture information 401 of the contact father, a name 402 of the contact father, a recent chat record 403 with the contact father, and occurrence time 404 of the recent chat record.

When determining that the distance between the notebook computer and the mobile phone is less than or equal to the preset distance, the mobile phone may send information about the plurality of interface elements on the currently displayed home page of the social application to the notebook computer. As shown FIG. 4(*b*), in response to receiving the information that is about the plurality of interface elements and that is sent by the mobile phone, the notebook computer may display a home page display window 408 of another social application, where the window 408 includes the chat records 400 between the user and the contact father, the chat records 405 between the user and the contact mother, the chat records 406 between the user and the contact Sam, and the chat records 407 between the user and the contact Lucy.

In an embodiment, the mobile phone may further send a device name (for example, Mate 40) and a user name (for example, Lily) of the mobile phone to the notebook computer. The notebook computer may further prompt, on the window 408, the user that a display interface of the social application is from Lily's Mate 40.

In an embodiment, in response to receiving the information that is about the plurality of interface elements and that is sent by the mobile phone, in addition to restoring the home page of the social application displayed on the mobile phone, the notebook computer may further draw a minimized window control 409 and a window close control 410.

In an embodiment, when detecting a zoom-out or zoom-in operation performed by the user on the window 408, the notebook computer may further adjust a size of the window 408.

As shown in FIG. 4(*b*), when the notebook computer detects that the user clicks the chat records with the contact father, the mobile phone and the notebook computer each may display a GUI shown in FIG. 4(*c*).

As shown in FIG. 4(*c*), in response to detecting that the user clicks the chat records with the contact father, the notebook computer may send a touch event and label information of the chat records 400 to the mobile phone. In response to receiving the touch event and the label information, the mobile phone may determine that the user clicks the chat records with the contact father on the notebook computer, so that the mobile phone may display a chat interface between the user and the contact father. The chat interface includes a plurality of interface elements, for example, a return control 411, a name 412 of the contact father, time information 413 of a recent chat record between the user and the contact father, a profile picture 414 of the user, and content 415 of the recent chat record between the user and the contact father. In addition, the mobile phone may further send information about the plurality of interface elements on the chat interface to the notebook computer. In response to receiving the information that is about the plurality of interface elements and that is sent by the mobile phone, the notebook computer may update content in the window 408. As shown in FIG. 4(*c*), the notebook computer may display, in the window 408, the return control 411, the name 412 of the contact father, the time information 413 of the recent chat record between the user and the contact father, the profile picture 414 of the user, and the content 415 of the recent chat record between the user and the contact father. In response to receiving the information about the plurality of interface elements, the notebook computer may further draw a text input box 416 in the window 408, where the text input box 416 may be used for text input, and the text input box further includes a voice control 417 and a sending control 418.

As shown in FIG. 4(*d*), after the user receives information "OK, please make a reservation and I'll watch it when I go home" sent by the contact father, the mobile phone may display another chat interface between the user and the contact father. Compared with the chat interface displayed on the mobile phone in FIG. 4(*c*), a plurality of interface elements are further added to the chat interface, for example, time information 419 (for example, "08:00") of receiving the message by the mobile phone, profile picture information 420 of the contact father, and content 421 of the message. In response to receiving the message, the mobile phone may further send, to the notebook computer, information about the interface elements newly added after the interface is updated, for example, the time information 419, the profile picture information 420 of the contact father, and information about the content 421 of the message. In response to receiving the information that is about the plurality of interface elements and that is sent by the mobile phone, the notebook computer may update content in the window 408. As shown in FIG. 4(*d*), the notebook computer may display, in the window 408, the return control 411, the name 412 of the contact father, the time information 413, the profile picture 414 of the user, the content 415 of the chat record, and the newly added interface elements (including the time information 419, the profile picture information 420 of the contact father, and the content 421 of the message).

When detecting that the user enters text content "OK" in the text input box 416, the notebook computer may send the text content to the mobile phone. In response to receiving the text content, the mobile phone may display the text content "OK" in a text input box 422. When detecting an operation of clicking the sending control 418 by the user, the notebook computer may send a touch event and label information of the control 418 to the mobile phone. In response to receiving the touch control event and the label information of the control 418, the mobile phone may determine that the user clicks the sending control on the notebook computer. Therefore, the mobile phone may send the content "OK" in the text input box to the contact father.

As shown in FIG. 4(*e*), in response to sending the text content to the contact father, the mobile phone may display another chat interface between the user and the contact father. Compared with the chat interface displayed on the mobile phone in FIG. 4(*d*), a profile picture 423 of the user and content 424 replied by the user are further added to the chat interface. In response to completing replying to the message, the mobile phone may further send, to the notebook computer, information about newly added interface elements after the interface is updated, for example, the profile picture 423 of the user and the content 424 replied by the user. In response to receiving the information that is about the plurality of interface elements and that is sent by the mobile phone, the notebook computer may update content in the window 408. As shown in FIG. 4(*e*), the notebook computer may display, in the window 408, the return control 411, the name 412 of the contact father, the time information 413, the profile picture 414 of the user, the content 415 of the chat record, the time information 419, the profile picture information 420 of the contact father, the content 421 of the message, and the newly added interface elements (including the profile picture 423 of the user and the content 424 replied by the user).

In an embodiment of the application, the mobile phone may send the plurality of interface elements on the display interface of the social application to the notebook computer, to display the window 408 on the notebook computer. The window 408 adapts to a wide screen of the notebook computer. For example, compared with the text input box 422 on the mobile phone, the text input box 416 in the window 408 has a larger area, and is more convenient for the user to perform text input, so that an input of the user is no longer limited by the narrow text input box of the mobile phone. In addition, when replying to a message on the notebook computer, the user may invoke an input method and the text input box of the notebook computer, and may perform text input by using a keyboard, so that the user can quickly complete replying to the message.

FIG. 5(*a*) to FIG. 5(*d*) each show a group of GUIs according to an embodiment of this application.

As shown in FIG. 5(*a*), a mobile phone displays a desktop of the mobile phone. A notebook computer is located near the mobile phone, and the notebook computer may display a desktop of the notebook computer. When detecting that a user taps an icon of a gallery application, the mobile phone and the notebook computer each may display a GUI shown in FIG. 5(*b*).

It should be understood that when a distance between the mobile phone and the notebook computer is less than or equal to a preset distance, the mobile phone and the notebook computer may be networked. For a networking process, refer to the descriptions in the foregoing embodiment. Details are not described herein again.

As shown in FIG. 5(*b*), in response to detecting an operation of tapping the icon of the gallery application by the user, the mobile phone may display a display interface of the gallery application. The display interface of the gallery application includes a plurality of interface elements, for example, thumbnails of a plurality of photos 501 to 515.

When determining that the distance between the notebook computer and the mobile phone is less than or equal to the preset distance, the mobile phone may send information about the plurality of interface elements on a currently displayed home page of the gallery application to the notebook computer. As shown in FIG. 5(*b*), in response to receiving the information that is about the plurality of interface elements and that is sent by the mobile phone, the notebook computer may display a window 516, where the window 516 includes the thumbnails of the plurality of photos.

In an embodiment, the mobile phone may further send a device name (for example, Mate 40) and a user name (for example, Lily) of the mobile phone to the notebook computer. The notebook computer may further prompt, on the window 516, the user that the display interface of the gallery application is from Lily's Mate 40.

As shown in FIG. 5(*c*), when detecting an operation of selecting thumbnails of the photos 501 to 509 and dragging the thumbnails to a folder by the user, the notebook computer may send request information to the mobile phone, where the request information requests image information of the photos 501 to 509, and the request information further includes label information of the thumbnails of the photos 501 to 509. In response to receiving the request information, the mobile phone may send the image information of the photos 501 to 509 to the notebook computer. In response to receiving the image information that is of the photos 501 to 509 and that is sent by the mobile phone, the notebook computer may store the photos 501 to 509 in the folder.

As shown in FIG. 5(*d*), when detecting an operation of double-clicking the folder by the user, the notebook computer may display a display window 517 of the folder, where the display window 517 of the folder includes information about the photos 501 to 509.

In an embodiment of the application, the mobile phone may send the plurality of interface elements on the display interface of the gallery application to the notebook computer, to display the window 516 on the notebook computer. When the user intends to store a plurality of photos in the gallery in the notebook computer, the user only needs to select the plurality of photos by using a mouse and drag the plurality of photos to a folder to which the photos are to be stored. This avoids a process in which the user sends photos to the notebook computer via the mobile phone, and helps improve user experience.

The foregoing describes several groups of GUIs in embodiments of this application with reference to FIG. 3(*a*) and FIG. 3(*b*) to FIG. 5(*a*) to FIG. 5(*d*). The following describes an implementation process of the technical solutions in embodiments of this application with reference to the accompanying drawings.

Figure 6:
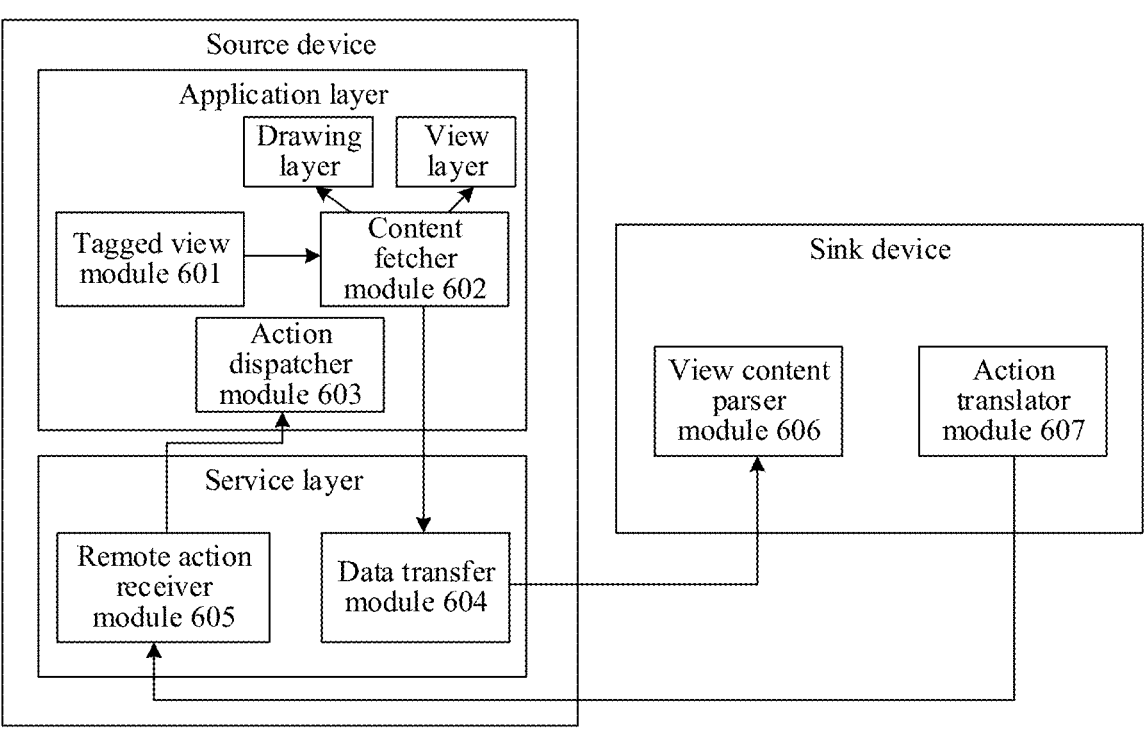
FIG. 6 is a schematic block diagram of a system architecture according to an embodiment of this application.

FIG. 6 is a schematic block diagram of a system architecture according to an embodiment of this application. The system architecture includes a source device and a client device. The source device includes an application layer and a service layer. The application layer includes a tagged view module 601, a content fetcher module 602, and an action dispatcher module 603. The service layer includes a data transfer module 604 and a remote action receiver module 605.

It should be understood that functions implemented by the tagged view module 601, the content fetcher module 602, and the action dispatcher module 603 may be implemented by the view system at the application framework layer in FIG. 2.

The sink device includes a view content parser module 606 and an action translator module 607. The following describes the modules in the source device and the sink device in detail.

The tagged view module 601 is configured to mark a scenario and an interface element. The music playback interface displayed by the mobile phone in FIG. 3(*b*) is used as an example. The mobile phone may mark the entire interface as a music scene. The plurality of interface elements on the interface are also marked respectively. The source device may add corresponding labels to the plurality of interface elements, where the labels include information such as attributes and names of the interface elements. For example, Table 1 is a schematic diagram of a correspondence between an interface element and a label corresponding to the interface element.

TABLE 1

| Interface element | Attribute | Label Name | ID |
|---|---|---|---|
| Interface element 301 | Image view (Image view) | Cover picture | 1 |
| Interface element 302 | Text view (Text view) | Song name | 2 |
| Interface element 303 | Text view | Singer (singer) | 3 |
| Interface element 304 | Text view | Lyrics | 4 |
| Interface element 305 | Text view | Lyric that is being played | 5 |
| Interface element 306 | Image view | Download | 6 |
| Interface element 307 | Image view | Share | 7 |
| Interface element 308 | Image view | Volume | 8 |
| Interface element 309 | Image view | More functions | 9 |
| Interface element 310 | Image view | Progress bar | 10 |
| Interface element 311 | Image view | Mode selection control | 11 |
| Interface element 312 | Image view | Control for playing a previous song | 12 |
| Interface element 313 | Image view | Pause/Player control | 13 |
| Interface element 314 | Image view | Control for playing a next song | 14 |
| Interface element 315 | Image view | Like control | 15 |
| . . . | . . . | . . . | . . . |

Figure 4A:
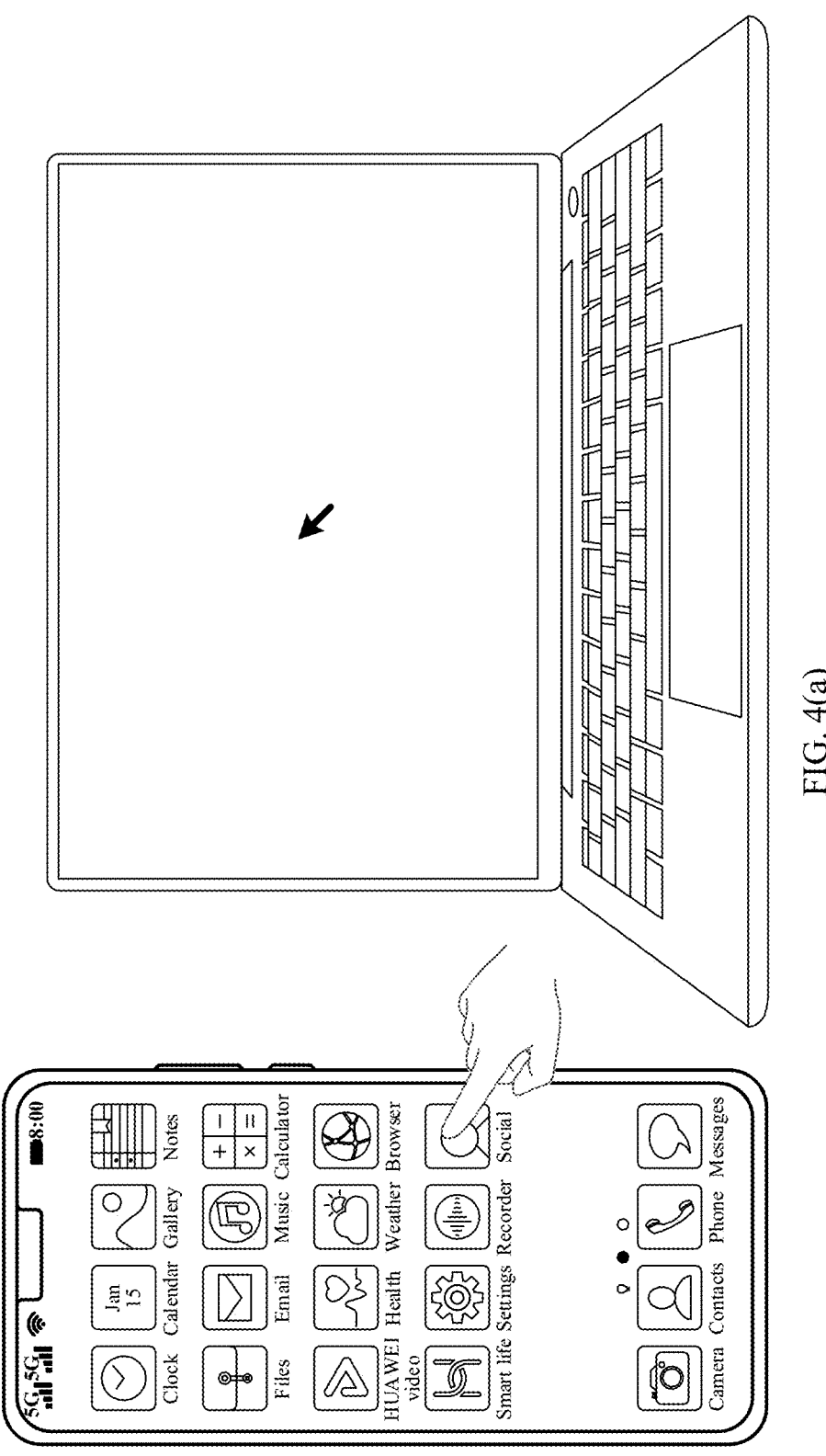
FIG. 4(a) to FIG. 4(e) each show another set of graphical user interfaces according to an embodiment of this application.
Figure 4B:
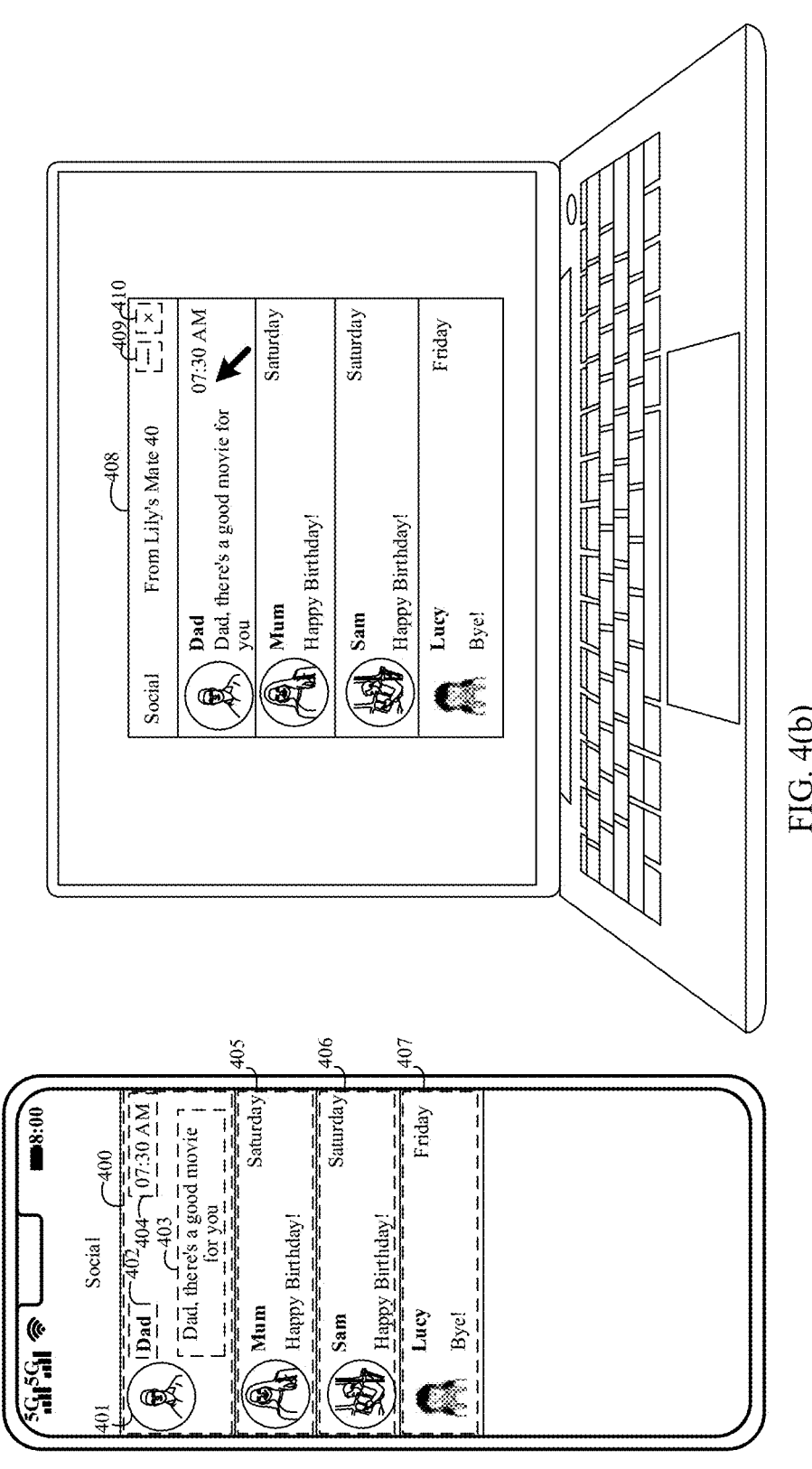
Figure 4C:
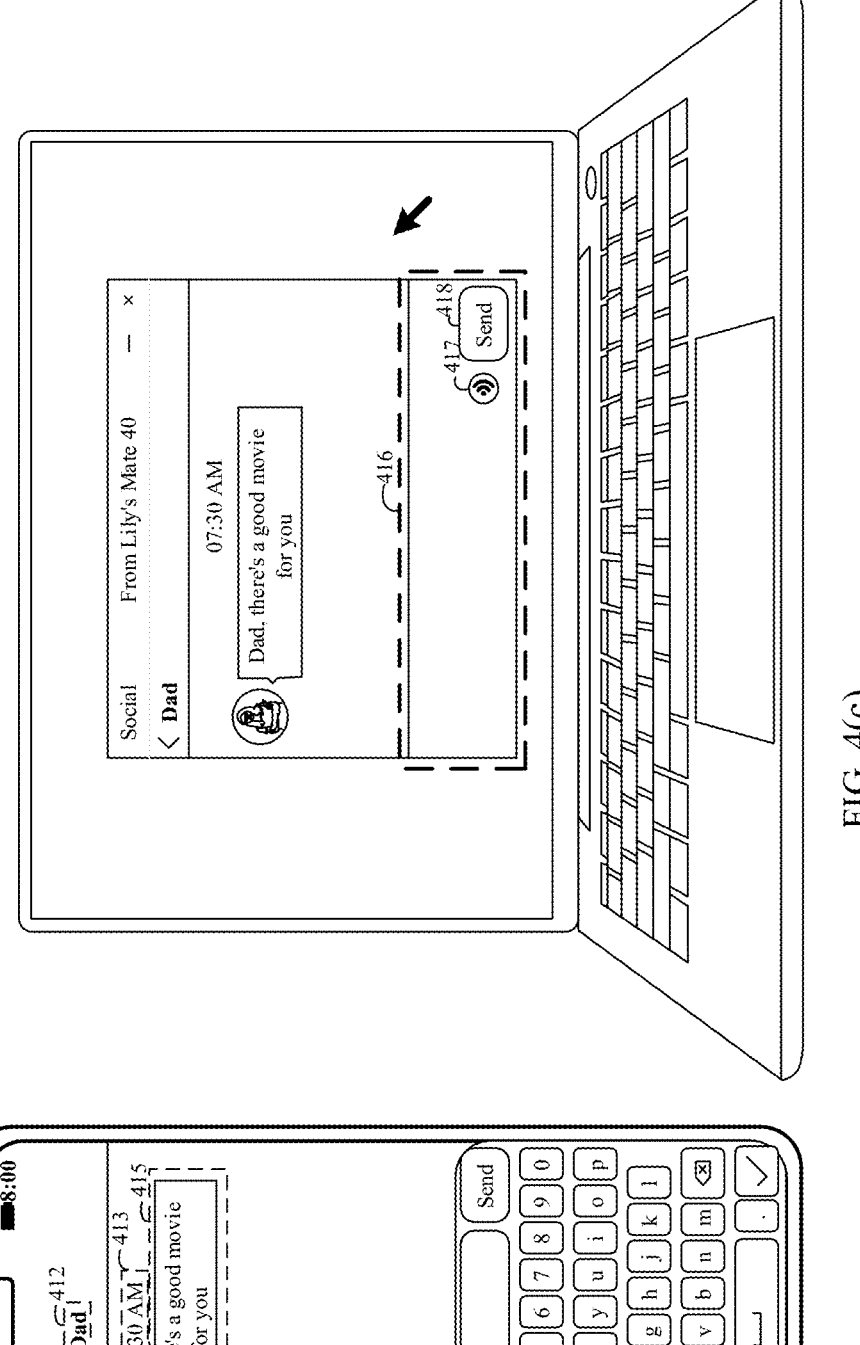
Figure 4D:
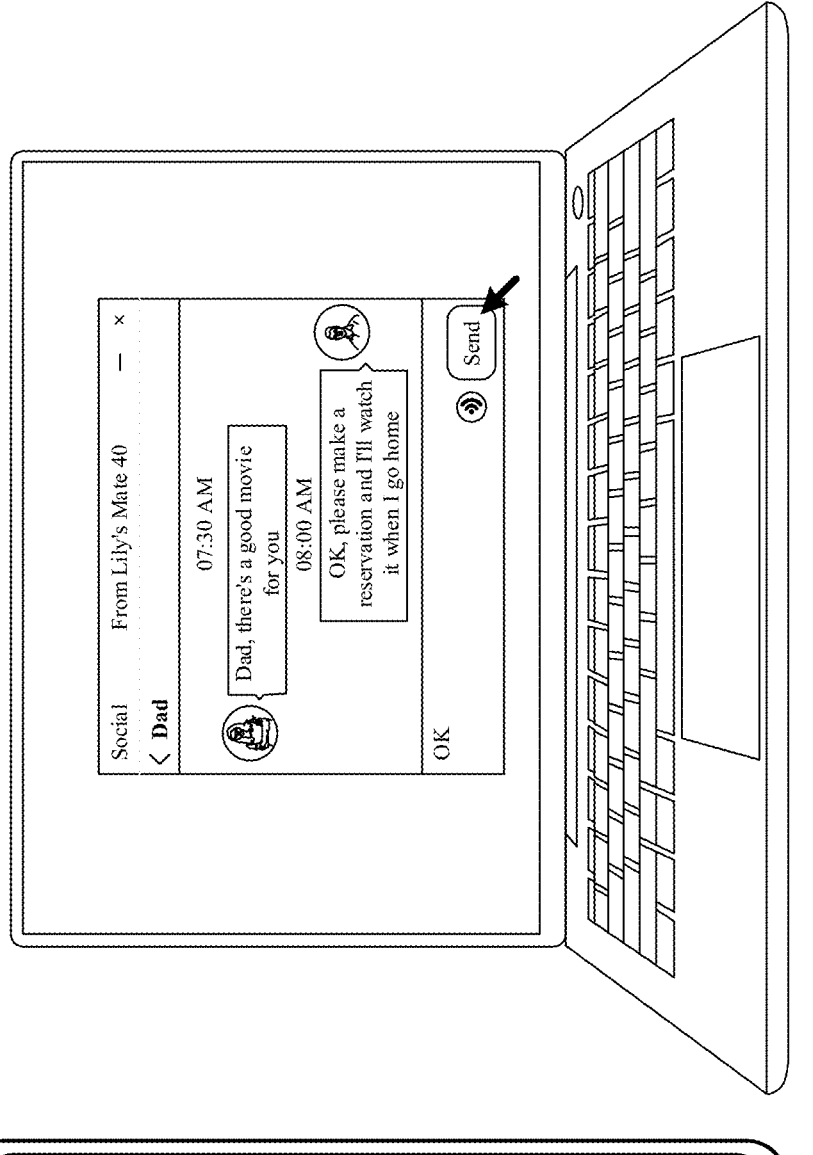
Figure 4E:
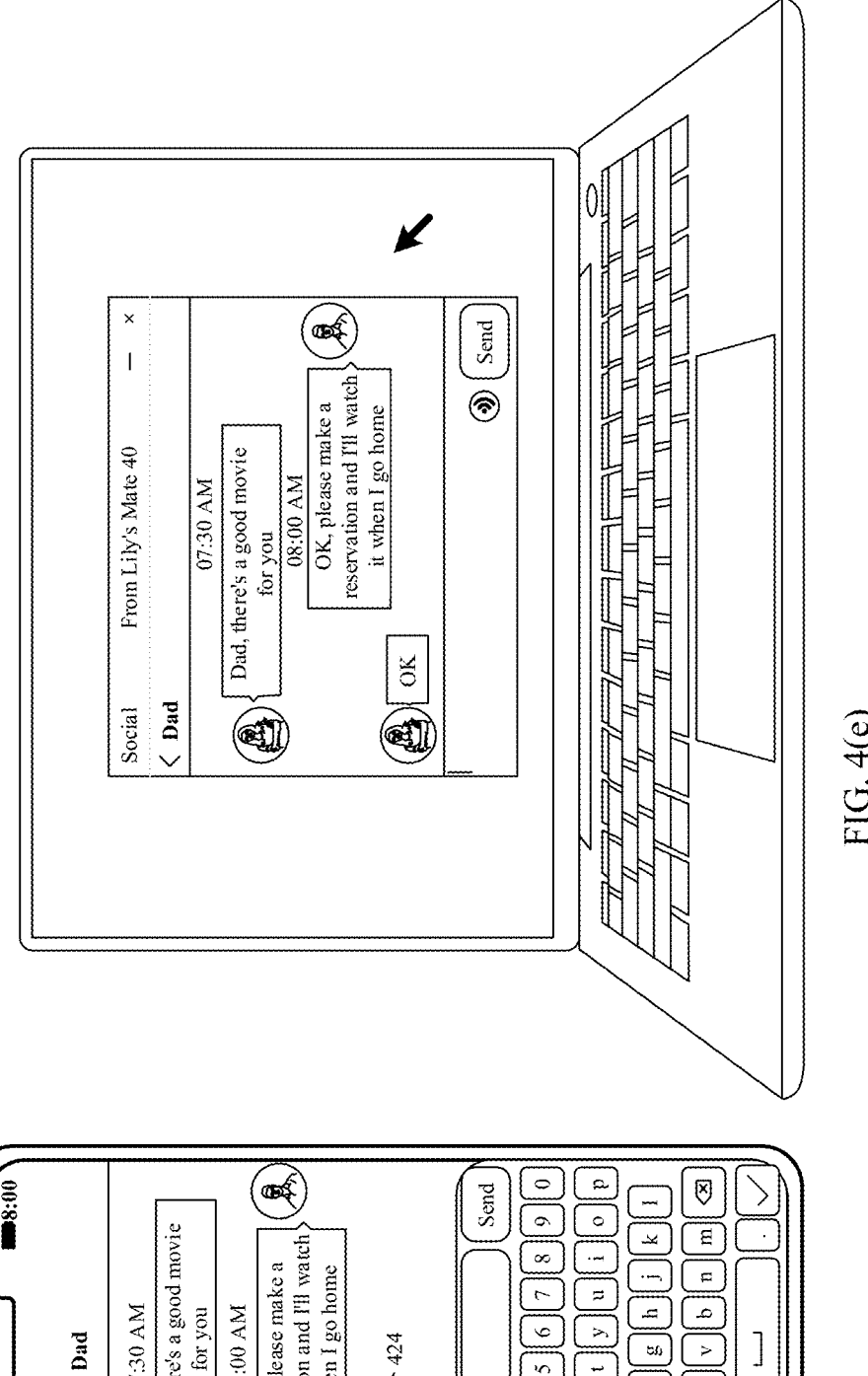
Figure 5A:
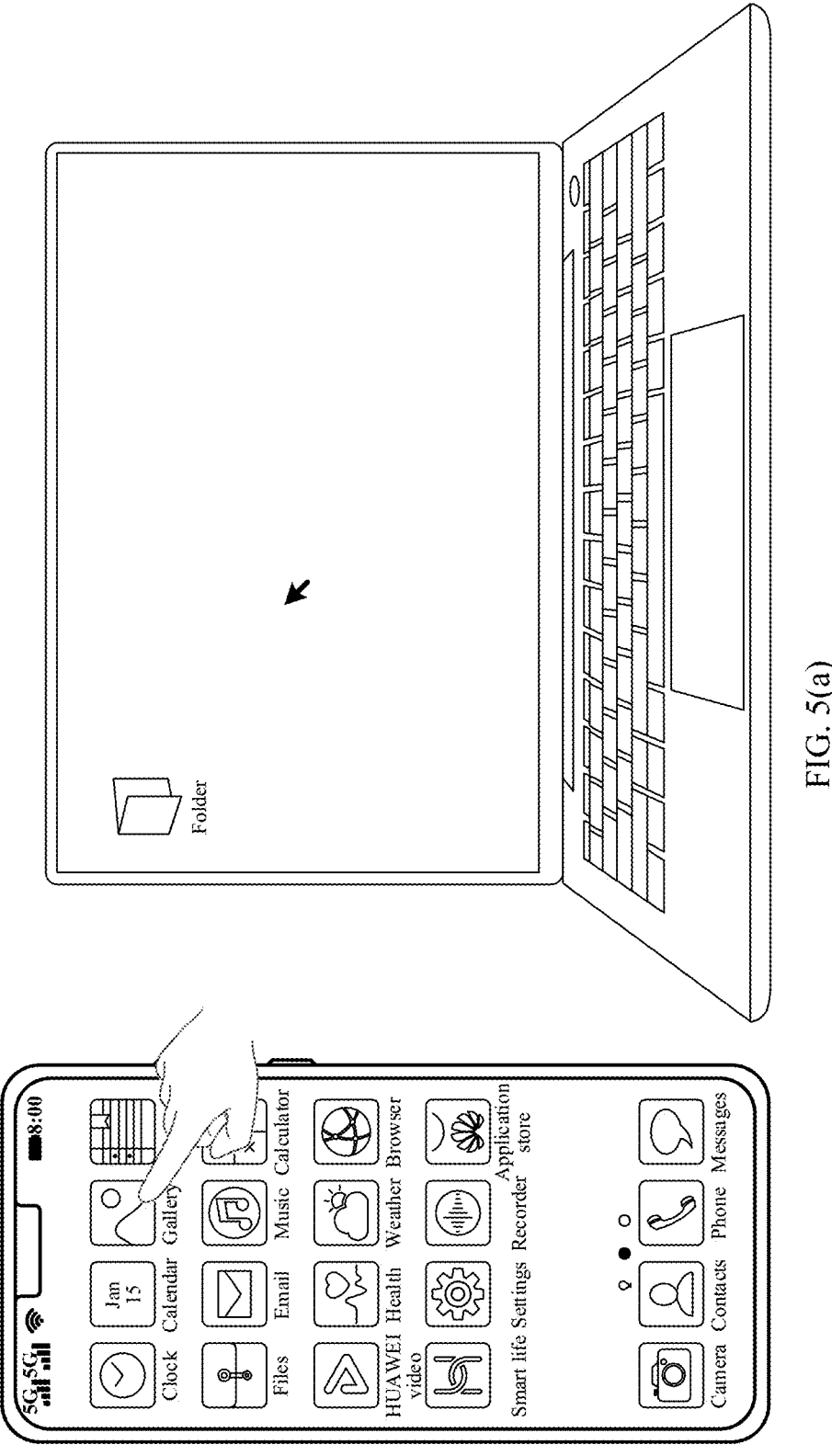
FIG. 5(a) to FIG. 5(d) each show another set of graphical user interfaces according to an embodiment of this application.
Figure 5B:
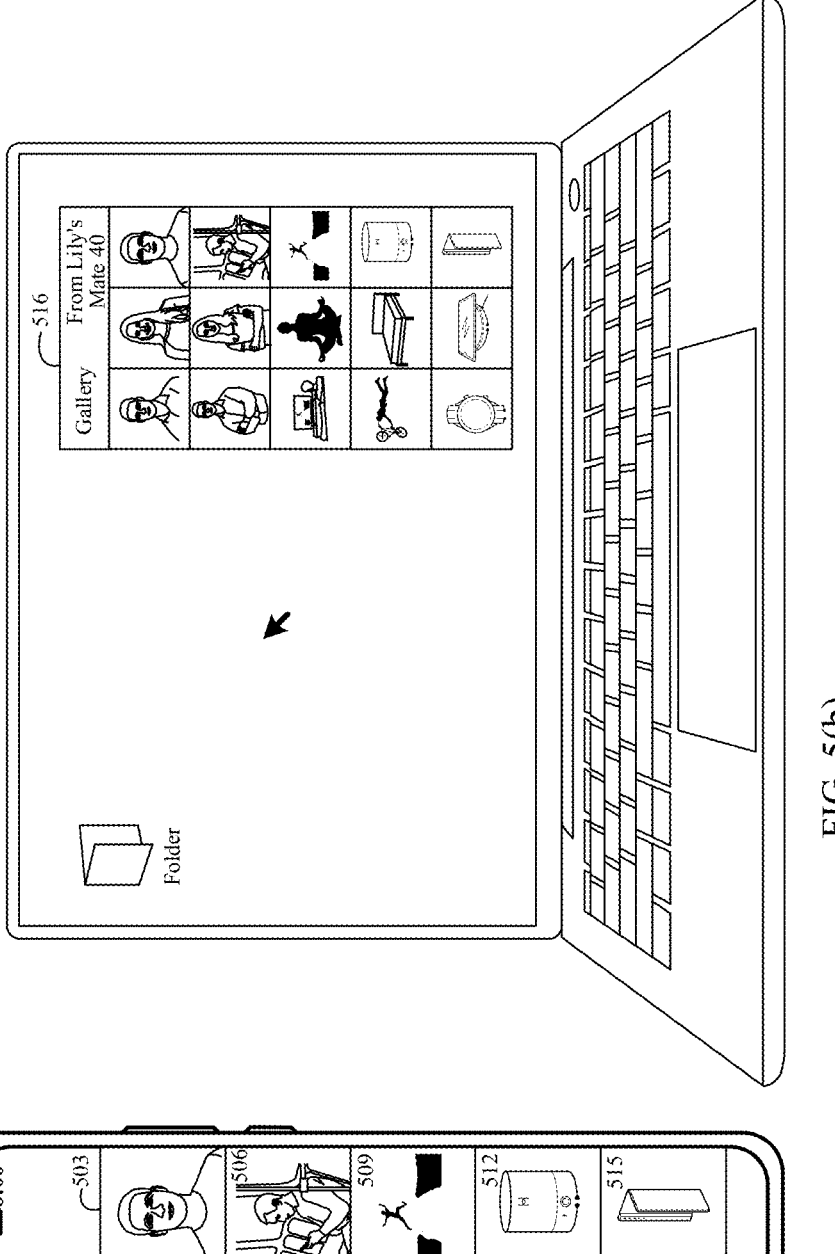
Figure 5C:
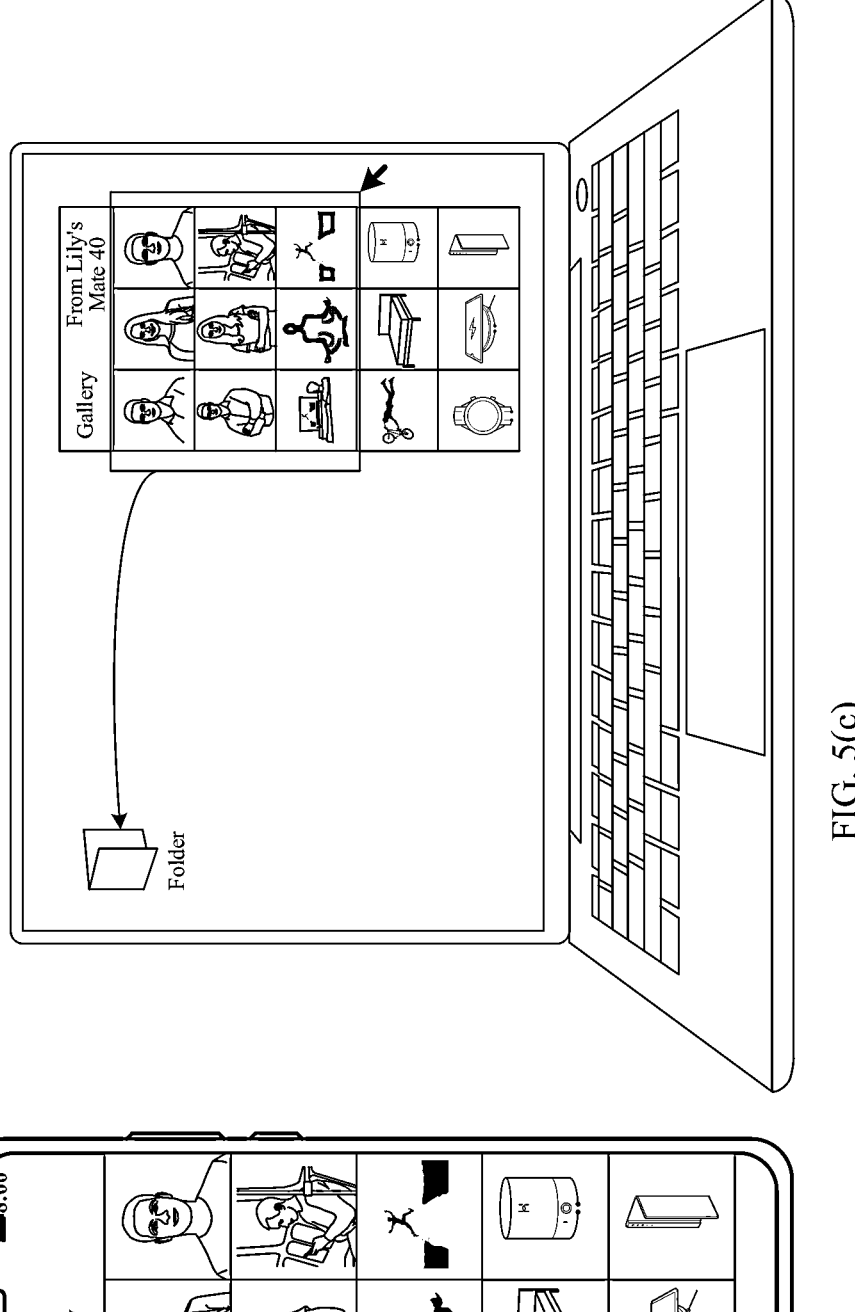
Figure 5D:
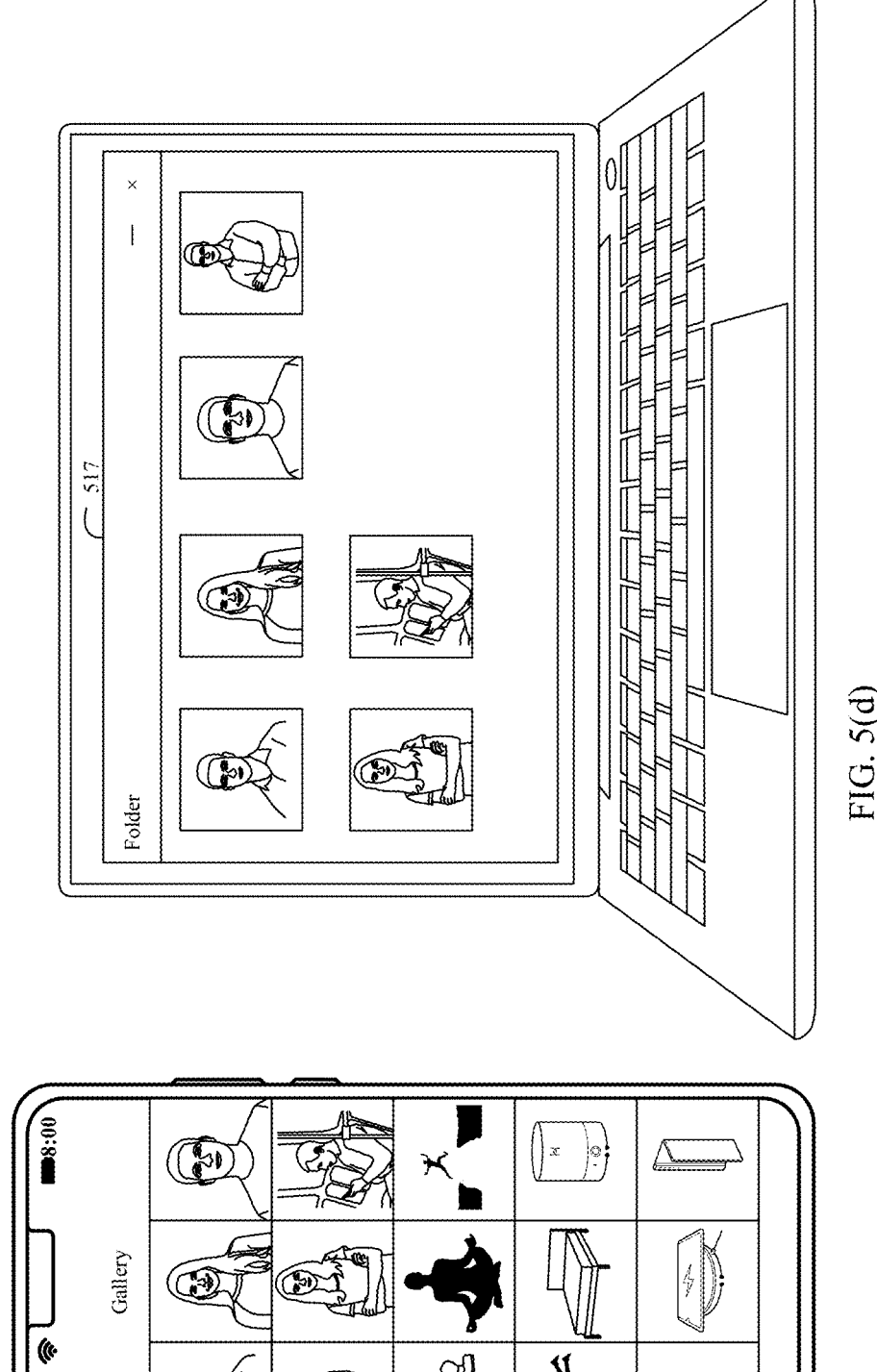

In an embodiment, for some scenarios (for example, a chat scenario), the source device may further list the plurality of interface elements, and after the listing, label the interface elements in each list. The GUI displayed by the mobile phone in FIG. 4(b) is used as an example. The mobile phone may mark the entire interface as a chat scenario. The mobile phone can list each chat record. After the chat records are listed, the mobile phone may label the interface elements in each list. For example, Table 2 is a schematic diagram of a correspondence between an interface element and a label corresponding to the interface element.

TABLE 2

| Interface element | Group | Attribute | Label Name | ID |
|---|---|---|---|---|
| Interface element 401 | List 1 | Image view | Contact profile picture | 1 |
| Interface element 402 | | Text view | Contact name | 2 |
| Interface element 403 | | Text view | Recent chat content | 3 |
| Interface element 404 | | Text view | Time information of recent chat content | 4 |
| . . . | . . . | . . . | . . . | . . . |

It should be understood that Table 1 and Table 2 described above are merely examples, and the interface element and the label information corresponding to the interface element may alternatively correspond in another manner. This embodiment of this application is not limited thereto.

The content fetcher module 602 is configured to fetch an interface element and send the fetched interface element to the data transfer module 604 of the service layer. The music scenario shown in FIG. 3(b) is used as an example. The content fetcher module 602 of the source device may fetch the interface element 301 corresponding to the cover picture, the interface element 302 corresponding to the song name, the interface element 303 corresponding to the singer, the interface element 305 corresponding to the lyric that is being played, the interface element 315 corresponding to the like control, the interface element 312 corresponding to the control for playing the previous song, the pause/player control 313, and the control 314 for playing the next song.

Figure 7:
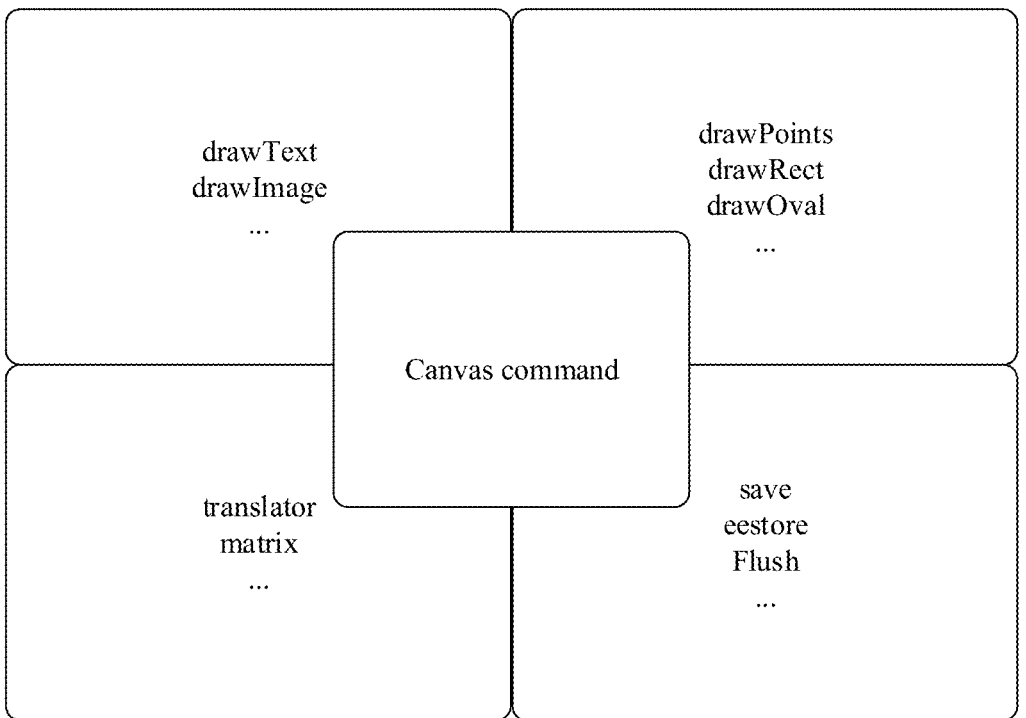
FIG. 7 is a schematic diagram of drawing commands according to an embodiment of this application.

A manner of fetching the interface element by the content fetcher module 602 includes but is not limited to the following manners:
Manner 1
Fetch an interface element from a command of a drawing layer. The command of the drawing layer includes all information restored by each interface element. FIG. 7 is a schematic diagram of drawing commands. There are more than 40 drawing commands, where two types of commands: drawText and drawImage have content. The source device may fetch content of an interface element from the two types of commands.
Manner 2
Fetch an interface element from a view layer (or control layer). A TextView control in Android is used as an example. Developers can invoke an interface setText of TextView to set a text to be displayed. In an embodiment of the application, the source device may record the set text, to complete fetching of an interface element whose attribute is TextView. Similarly, the developers may also invoke an interface setImage of ImageView to set image information to be displayed. The source device may record the set image information, to complete fetching of an interface element whose attribute is ImageView.

It should be understood that, as shown in FIG. 6, the application layer may include a drawing layer and a view layer (or a control layer), and the drawing layer and the view layer may implement interface display on the source device. The view layer may provide an interface element, for example, TextView or ImageView, for the developers to establish an interface. The developers may set a text style, a text size, a text thickness, and the like through an interface (for example, setText) provided by TextView. The content fetcher module 602 may directly complete fetching of the interface element at the view layer. Alternatively, the interface element provided by the view layer may be converted into commands such as drawText and drawImage at the drawing layer, and the content fetcher module 602 may alternatively fetch the interface element at the drawing layer via the commands such as drawText and drawImage.

Method 3

Developers of an application may customize content. For example, the developers may set content in a format <key, value> for a plurality of interface elements included on an interface, so that the source device may fetch an interface element having the content in this format.

The data transfer module 604 may send a scenario name (for example, a music scenario or a chat scenario) of a display interface of the source device and information about a marked interface element (including label information of the interface element and the interface element fetched by the content fetcher module 602) to the view content parser module 606 of the sink device.

In an embodiment, the source device may send a BLE data packet to the sink device, where the BLE data packet may carry the interface element and the label information of the interface element. The BLE data packet includes a protocol data unit (PDU). The interface element and the label information of the interface element may be carried in a service data (service data) field in the PDU, or may be carried in a manufacturer data field in the PDU. For example, a payload of the service data field may include a plurality of bits. The plurality of bits include an extensible bit. The source device and the sink device may agree on content of an extensible bit.

For example, for a graphic interface element (ImageView), the source device may perform image encoding on the graphic interface element by using an image encoding technology, and carry data obtained through image encoding in a first bit (where the first bit may include one or more bits). In addition, the source device may encode label information of the graphic interface element. For example, the graphic interface element is the interface element 301 in Table 1, and label information of the interface element 301 may be a name "cover picture". The source device may encode the label information by using GBK, ISO8859-1, Unicode (for example, UTF-8 or UTF-16), or other encoding manners, and carry encoded data in a second bit (where the second bit may include one or more bits). The source device may associate the first bit with the second bit. After receiving the BLE data packet, the sink device may decode the data in the first bit by using an image decoding technology, to obtain the interface element 301. In addition, the sink device may further decode information in the second bit, to obtain the label information "cover picture" of the interface element 301.

For another example, for a text interface element (TextView), the source device may encode the text interface element by using GBK, ISO8859-1, Unicode (for example, UTF-8 or UTF-16), or other encoding manners, and carry data obtained through image encoding in a third bit (where the third bit may include one or more bits). In addition, the source device may encode label information of the text interface element. For example, the text interface element is the interface element 303 in Table 1, and label information of the interface element 303 may be a name "singer". The source device may encode the label information by using GBK, ISO8859-1, Unicode (for example, UTF-8 or UTF-16), or other encoding manners, and carry encoded data in a fourth bit (where the fourth bit may include one or more bits). The source device may associate the third bit with the fourth bit. After receiving the BLE data packet, the sink device may decode the data in the third bit by using a corresponding decoding technology, to obtain the interface element 303. In addition, the sink device may further decode information in the fourth bit, to obtain the label information "singer" of the interface element 303.

It should be understood that, for interface elements such as a music playback progress bar and an on/off control that belong to neither a graphic interface element nor a text interface element, the source device may convert these interface elements and the on/off control into character strings, so that the source device may also encode these interface elements and label information of the interface elements by using GBK, ISO8859-1, Unicode (for example, UTF-8 or UTF-16), or other encoding manners.

In an embodiment, in addition to sending the interface element and the label information of the interface element to the sink device, the source device may further send scenario information corresponding to the interface element to the sink device. For example, for the GUI shown in FIG. 3(*a*) and FIG. 3(*b*), the BLE data packet sent by the mobile phone to the notebook computer may further carry scenario information "music". For an implementation process in which the source device includes the scenario information in the BLE data packet, refer to a process in which the source device includes the label information in the BLE data packet. Details are not described herein again.

In an embodiment, the label information may be a name, or may be an ID. For example, for the interface element 301, the source device and the sink device may agree that a name corresponding to an interface element whose ID is 1 is "cover picture", and may agree that a name corresponding to an interface element whose ID is 2 is "song name".

In an embodiment, the source device may send a user datagram protocol (UDP) data packet to the sink device, where the UDP data packet may carry the interface element and the label information of the interface element. The UPD data packet includes a data part of an IP packet. The data part of the IP packet may include an extensible bit. The source device and the sink device may agree on an extensible bit. Therefore, the source device may include the interface element and the label information of the interface element in the extensible bit.

In an embodiment, the source device may send a transmission control protocol (TCP) data packet to the sink device, where the TCP data packet may carry the interface element and the label information of the interface element. The TCP data packet includes a TCP header and a TCP data part, and notification information may be carried in the TCP data part. For example, the TCP data part may include a plurality of bits. The plurality of bits include an extensible bit. Therefore, the source device may include the interface element and the label information of the interface element in the extensible bit. For example, for an information transmission process of interface elements such as the graphic interface element, the text interface element, the progress bar, and the on/off control, refer to the descriptions in the foregoing embodiment. Details are not described herein again.

The view content parser module 606 of the sink device is configured to parse a received data packet after receiving the data packet sent by the data transfer module 604 of the source device, to obtain one or more interface elements and label information of the one or more interface elements. In an embodiment, the sink device may further obtain current scenario information.

Figures 8, 9:
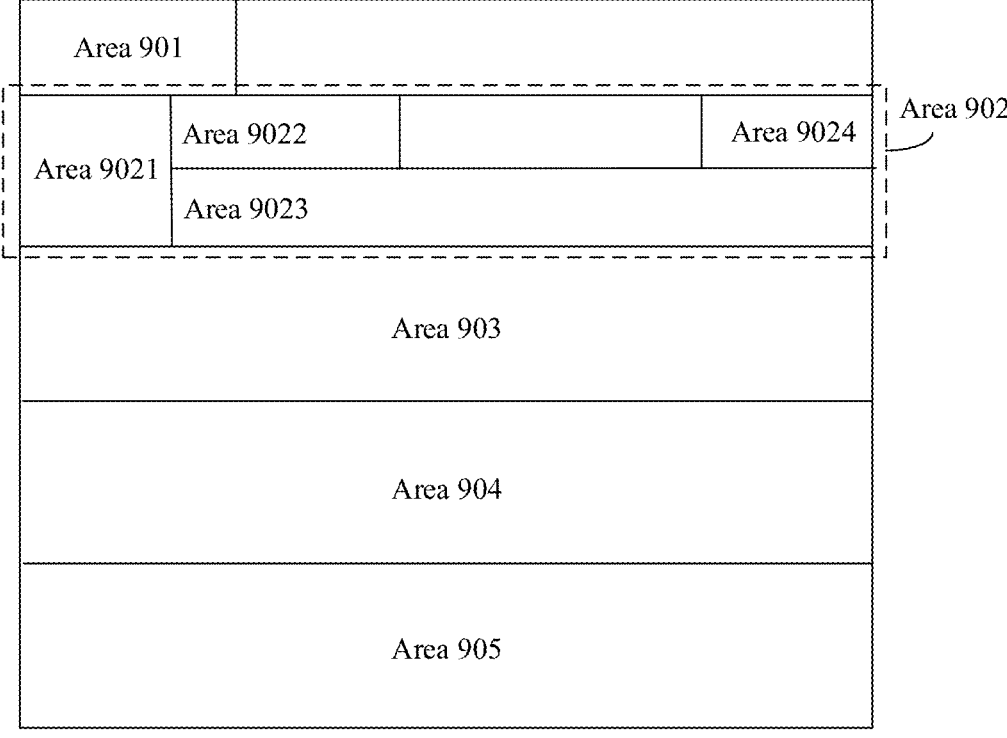
FIG. 8 is a schematic diagram of area distribution of interface elements in a music scenario according to an embodiment of this application.
FIG. 9 is a schematic diagram of area distribution of interface elements in a chat scenario according to an embodiment of this application.

The sink device stores a correspondence between a display area of an interface element and label information of the interface element in different scenarios. FIG. 8 and FIG. 9 are respectively schematic diagrams of area distribution of interface elements in a music scenario and a chat scenario.

For example, FIG. 8 is a schematic diagram of area distribution of interface elements in a music scenario stored in a sink device. An area 801 may display a cover picture. An area 802 may display a song name. An area 803 may display a singer. An area 804 may display a lyric that is being played. An area 805 may display a like control. An area 806 may display a control for playing a previous song. An area 807 may display a pause/player control. An area 808 may display a control for playing a next song.

A view content parser module may place an interface element in a specified area based on each interface element obtained through parsing and label information correspond- ing to each interface element. For example, when the sink device parses out the interface element 301 and a name in the label information of the interface element 301 is the cover picture, the sink device may place the interface element 301 in the area 801. When the sink device parses out the interface element 302 and a name in the label informa- tion of the interface element 302 is the song name, the sink device may place the interface element 302 in the area 802.

For example, FIG. 9 is a schematic diagram of area distribution of interface elements in a chat scenario stored in a sink device. An area 901 may display a name of an application program. An area 902 may display a first group of chat records. The area 902 may further include a plurality of sub-areas. For example, an area 9021 may display a contact profile picture, an area 9022 may display a contact name, an area 9023 may display recent chat content of the user and a contact, and an area 9024 may display time information of a recent chat between the user and the contact. By analogy, a second group of chat records, a third group of chat records, and a fourth group of chat records may be displayed in areas 903 to 905.

A view content parser module may place an interface element in a specified area based on each interface element obtained through parsing and label information correspond- ing to each interface element. For example, the sink device parses out that the interface elements 401 to 404 are inter- face elements in the first group of chat records. If a name in label information of the interface element 401 is a contact name, the sink device may place the interface element 401 in the area 9021. If a name in label information of the interface element 402 is a contact name, the sink device may place the interface element 402 in the area 9022. If a name in label information of the interface element 403 is the recent chat content, the sink device may place the interface element 403 in the area 9023. If a name in label information of the interface element 404 is time information of the recent chat, the sink device may place the interface element 404 in the area 9024. Similarly, the sink device may separately place other interface elements in the areas 902 to 904.

The action translator module 607 is configured to send a corresponding event and label information of an interface element corresponding to the event to the remote action receiver module 605 of the source device when the sink device detects a touch event (for example, a click event of a control).

In an embodiment, after the action translator module 607 of the sink device detects a click event of the user on a first interface element, the sink device may send a BLE data packet to the source device, where the BLE data packet includes type information of an event and label information of the first interface element. The BLE data packet includes a protocol data unit. The interface element and the label information of the interface element may be carried in a service data field in the PDU, or may be carried in a manufacturer data field in the PDU. For example, a payload of the service data field may include a plurality of bits. The plurality of bits include an extensible bit. The source device and the sink device may agree on content of an extensible bit. For example, the sink device is a notebook computer. When some extensible bits are 00, it indicates that the type of the event is selecting the first interface element. When some extensible bits are 01, it indicates that the type of the event is right-clicking after selecting the first interface element. For another example, the sink device may encode the label information of the first interface element by using GBK, ISO8859-1, Unicode (for example, UTF-8 or UTF- 16), or other encoding manners, and carry encoded data in one or more extensible bits. After parsing the BLE data packet, the source device may learn of the type of the event and the label information of the corresponding interface element, to learn that the sink device detects the correspond- ing event on the first interface element.

After receiving the event sent by the action translator module 607, the remote action receiver module 605 may send received information to the action dispatcher module 603. The action dispatcher module 603 may find a corre- sponding interface element based on label information of the interface element, and determine, based on a type of an event, an operation performed by the user on the interface element on the sink device. Therefore, the action dispatcher module 603 may update an interface element on a current display interface.

For example, as shown in FIG. 3(*b*), when the notebook computer detects an input of the user on the pause/player control, the notebook computer may send an event type (a click event) and label information of the interface element 313 to the mobile phone. In response to receiving the foregoing information, the mobile phone may determine that the user performs a click operation on the pause/player control on the notebook computer, so that the mobile phone may pause the music that is being played. The mobile phone updates the interface element 313 from a playback state to a pause state. In addition, the mobile phone stops sending audio content corresponding to the song to the notebook computer, and the mobile phone may further send the updated interface element 313 and the label information of the interface element 313 to the notebook computer, so that the notebook computer may display the updated interface element 313.

In an embodiment, if one or more interface elements include a second interface element and a state of the second interface element is updated in real time, after a first electronic device sends the one or more interface elements and label information of the one or more interface elements to a second electronic device, the first electronic device may send the updated second interface element and label infor- mation of the second interface element to the second elec- tronic device in real time after detecting that the state of the second interface element is updated. The interface element 305 shown in FIG. 3(*b*) is used as an example. The lyrics that are being played are updated in real time. For example, the lyric "ExxxxxxxF" is played at 00:12 to 00:15, and the lyric "GxxxxxxxH" is played at 00:16 to 00:18. In this case, when the song is played at 00:16, the mobile phone may send the updated interface element 305 ("GxxxxxxxH") and label information of the interface element 305 to the notebook computer. In this way, after receiving the updated interface element 305 and the label information of the interface element 305, the notebook computer may update content of the lyric that is being played.

In an embodiment, as shown in FIG. 4(*d*), when the detecting that the user enters the text content "OK" in the text input box 416, the notebook computer may send the text content and label information of the text input box to the mobile phone. For example, the notebook computer may send a BLE data packet to the mobile phone, and the text content and the label information of the text input box may be carried in a service data field in a PDU. The notebook computer may encode the text content and the label information of the text input box by using GBK, ISO8859-1, Unicode (for example, UTF-8 or UTF-16), or other encoding manners, and carry encoded data in an extensible bit of the service data field. After receiving the BLE data packet, the mobile phone may decode the data in the extensible bit to obtain the text content and the label information of the text input box, so that the mobile phone may place the text content in the text input box 422 of the mobile phone for display.

When r detecting an operation of clicking the sending control 418 by the user, the notebook computer may send a corresponding event type and label information of the control 418 to the mobile phone. For a sending process, refer to the descriptions in the foregoing embodiment. Details are not described herein again. After receiving the event type and the label information of the control 418, the mobile phone may determine that the notebook computer detects that the user clicks the sending control. Therefore, the mobile phone can complete sending of the content in the text input box 422.

It should be understood that, in an embodiment of the application, the text input box 416 may be drawn by the notebook computer. The notebook computer and the mobile phone may agree on the text input box 416, the voice control 417, and the label information of the sending control 418 in advance. In this way, after receiving the content sent by the notebook computer, the mobile phone may learn of an operation performed by the user on the notebook computer.

Figure 10:
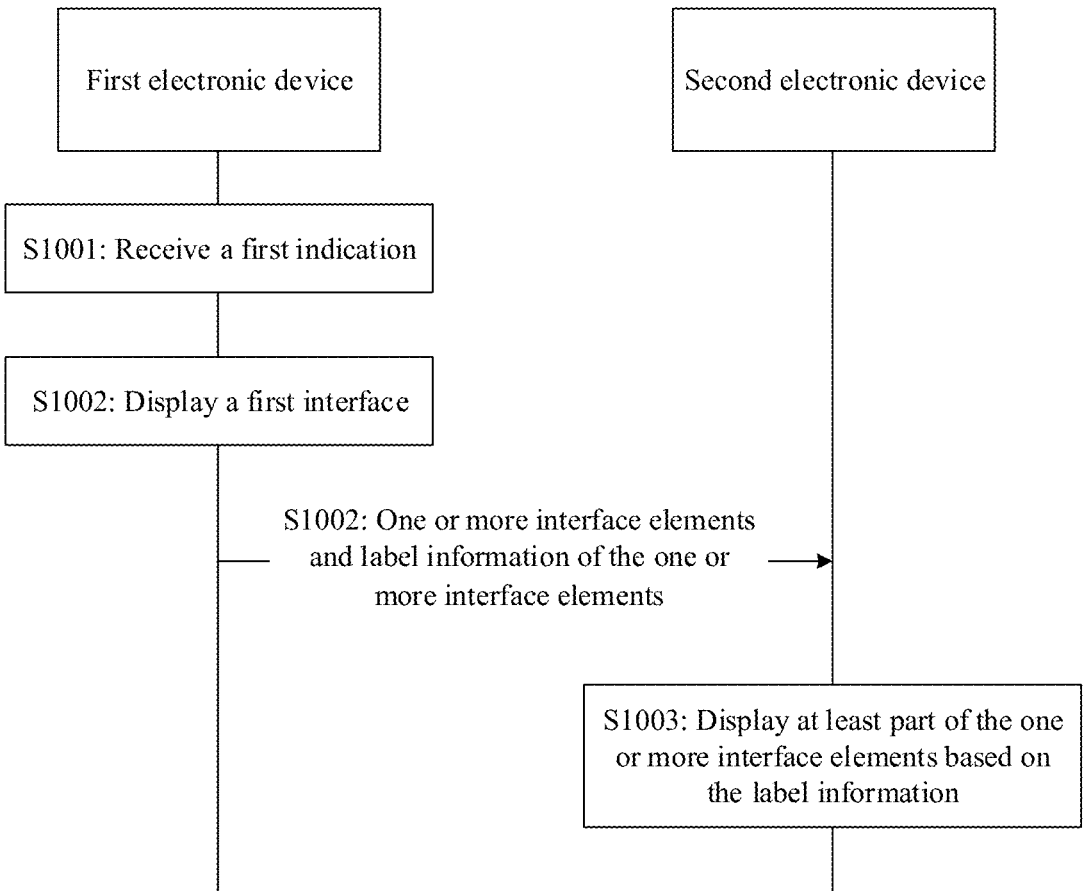
FIG. 10 is a schematic flowchart of a display method according to an embodiment of this application.

FIG. 10 is a schematic flowchart of a display method 1000 according to an embodiment of this application. The method 1000 may be performed by a first electronic device and a second electronic device. The first electronic device may be the foregoing source device, and the second electronic device may be the foregoing sink device. The method 1000 includes the following operations:

S1001. The first electronic device receives a first indication.

In an embodiment, the first indication may be that the first electronic device detects an operation of starting a first application program by a user.

In an embodiment, the first indication may be indication information sent by the second electronic device and received by the first electronic device, and the indication information indicates the first electronic device to send an interface element on a first interface to the second electronic device. For example, the second electronic device may send the indication information to the first electronic device when detecting that the user taps an icon associated with the first application program.

S1002: In response to receiving the first indication, the first electronic device displays the first interface and sends one or more interface elements and label information of the one or more interface elements to the second electronic device, where the first interface includes the one or more interface elements.

For example, as shown in FIG. 3(b), the first electronic device may be a mobile phone, the first interface may be a music playback interface, and the music playback interface includes the interface element 301 to the interface element 315.

It should be understood that, for a process in which the first electronic device sends the one or more interface elements and the label information of the one or more interface elements to the second electronic device, refer to the descriptions in the foregoing embodiment. Details are not described herein again.

In an embodiment, when a distance between the first electronic device and the second electronic device is less than or equal to a preset distance, the first electronic device may prompt the user to send the one or more interface elements on the first interface to the second electronic device for display. In response to an operation of determining to send the interface element on the first interface to the second electronic device by the user, the first electronic device may send the one or more interface elements and the label information of the one or more interface elements to the second electronic device.

In an embodiment, when the first electronic device determines that devices that are networked with the first electronic device include an electronic device supporting display of the one or more interface elements, the first electronic device may send the one or more interface elements and the label information of the one or more interface elements to the second electronic device. For example, after displaying the first interface, the first electronic device may send a query request to a device that is networked with the first electronic device, where the query request queries whether the device that receives the query request supports the display of the one or more interface elements. If the devices that are networked the first electronic device include the second electronic device and the second electronic device supports the display of the one or more interface elements, the second electronic device may send a response (ACK) to the first electronic device, so that the first electronic device learns that the second electronic device supports the display of the one or more interface elements.

For example, the first electronic device may send a BLE data packet to the second electronic device, where the BLE data packet may carry the query request. The BLE data packet includes a PDU. The query request may be carried in a service data field in the PDU, or may be carried in a manufacturer data field in the PDU. For example, a payload of the service data field may include a plurality of bits. The plurality of bits include an extensible bit. The first electronic device and the second electronic device may agree on content of an extensible bit. For example, when the extensible bit is 1, the second electronic device may learn that the first electronic device requests to query whether the second electronic device supports the display of the one or more interface elements.

If the second electronic device supports the display of the one or more interface elements, the second electronic device may send the BLE data packet to the first electronic device. For example, when an extensible bit in the BLE data packet is 1, the first electronic device may learn that the second electronic device supports the display of the one or more interface elements.

In an embodiment, if a plurality of devices that are networked with the first electronic device all support the display of the one or more interface elements, the first electronic device may further prompt the user to send the one or more interface elements to a device for display. In an embodiment, both the second electronic device and a third electronic device of the devices that are networked with the first electronic device support the display of the one or more interface elements, the first electronic device may further prompt the user to send the one or more interface elements to the second electronic device or the third electronic device for display. In response to an operation of selecting the second electronic device by the user, the first electronic device may send the one or more interface elements and the label information of the one or more interface elements to the second electronic device.

In an embodiment, the first indication may alternatively be request information from the second electronic device. For example, a display interface of the second electronic device may include an icon of an application. After detecting an operation of clicking an icon by the user, the second electronic device may send the request information to the first electronic device, where the request information requests information about one or more interface elements on the display interface of the application.

It should be understood that, that the display interface of the second electronic device includes an icon of an application does not mean that the application is installed on the second electronic device. When the second electronic device detects that the user clicks the icon, the second electronic device is triggered to send the request information to the first electronic device, where the request information requests the first electronic device to send icons of one or more application programs on the display interface of the application to the second electronic device.

For example, in response to detecting an operation of clicking an icon of a first application (for example, a music application or a chat application) by the user, the second electronic device may send a BLE data packet to the first electronic device. For example, when an extensible bit in the BLE data packet is 1, the first electronic device may learn that the second electronic device requests the first electronic device for information about one or more interface elements on a display interface of the first application.

In an embodiment, after the first electronic device and the second electronic device are networked, the second electronic device may send a query request to the first electronic device, where the query request requests to query whether the first application is installed on the first electronic device. For example, the second electronic device may send a BLE data packet to the first electronic device, where the BLE data packet may carry the query request. A payload of a service data field in the BLE data packet may include a plurality of bits. The plurality of bits include an extensible bit. The first electronic device and the second electronic device may agree on content of an extensible bit. For example, when the extensible bit is 1, the first electronic device may learn that the second electronic device requests to query whether the first application is installed on the first electronic device. If the first application is installed on the first electronic device, the first electronic device may send a response (ACK) to the second electronic device, so that the second electronic device may learn that the first application is installed on the first electronic device. Then, if the second electronic device detects the operation of clicking the icon of the first application by the user, the second electronic device may send the request information to the first electronic device.

S1003: The second electronic device may display a second interface based on the label information of the one or more interface elements, where the second interface displays at least part of the one or more interface elements.

In an embodiment, after receiving the one or more interface elements and the label information of the one or more interface elements, the second electronic device may display the second interface based on the label information of the one or more interface elements. For example, the second electronic device may select, from the label information, an interface element corresponding to label information with a higher priority level for display. The GUI shown in FIG. 3(b)

is used as an example. The mobile phone may send the interface elements 301 to 315 and the label information of the interface elements to the second electronic device, and the second electronic device may store priority information of the label information (for example, the priorities are sequentially the song name, the singer, the lyric that is being played, the control for playing the previous song, the pause/player control, and the control for playing the next lyric in descending order). In this case, the second electronic device may sequentially display the interface elements 302, 303, 305, 312, 313, and 314 based on the priority information and the label information of the interface elements 301 to 315.

In an embodiment, the second electronic device displays the at least part of the one or more interface elements based on a first mapping relationship and the label information of the one or more interface elements, where the first mapping relationship is a mapping relationship between display areas of the one or more interface elements and the label information of the one or more interface elements.

In an embodiment, the first mapping relationship may be stored in the first electronic device. When sending the interface element and the label information to the second electronic device, the first electronic device may further send the first mapping relationship to the second electronic device.

In an embodiment, for a same scenario (for example, a music scenario), the first electronic device may store different mapping relationships for different devices. For example, the first electronic device is a mobile phone. The mobile phone may store a first mapping relationship and a second mapping relationship. The first mapping relationship is a mapping relationship between a display area of an interface element in a notebook computer and label information of the interface element, and the second mapping relationship is a mapping relationship between a display area of an interface element in a smartwatch and label information of the interface element. For different sink devices, the mobile phone may send different interface elements and label information of the interface elements. For example, for the notebook computer, the mobile phone may send, to the notebook computer, the interface elements 301 to 303, 305, 312 to 315, and the label information corresponding to the interface elements. For another example, for the smartwatch, the mobile phone may send, to the smartwatch, the interface elements 302, 303, 305, and 312 to 314, and the label information corresponding to the interface elements.

In an embodiment, the first mapping relationship may alternatively be stored in the second electronic device. When receiving the interface element and the label information from the first electronic device, the second electronic device may display the second interface based on the label information of the interface element and the first mapping relationship.

In an embodiment, the second electronic device may store a mapping relationship between a display area of an interface element and label information of the interface element in different scenarios. For example, as shown in FIG. 8 and FIG. 9, the sink device may store mapping relationships between different areas and label information of different interface elements in the music scenario and the chat scenario. After the second electronic device receives the one or more interface elements and the label information of the one or more interface elements from the first electronic device, the sink device may select, based on the label information of the one or more interface elements, at least part of the one or more interface elements for display.

In an embodiment, the first electronic device may send all labeled interface elements on the first interface and label information of the interface elements to the second electronic device. After receiving all the labeled interface elements and the label information of the interface elements, the second electronic device may select, based on the first mapping relationship, some or all of the interface elements for display.

For example, as shown in FIG. 3(b), the mobile phone may send the labeled interface elements 301 to 315 and the label information corresponding to the labeled interface elements 301 to 315 to the notebook computer. After receiving the interface elements and the label information of the interface elements, the notebook computer may select, based on the correspondence between the display areas of the interface elements and the label information shown in FIG. 8, the interface element 301, the interface element 302, the interface element 303, the interface element 305, and the interface elements 312 to 315 from the interface elements 301 to 315 for display.

In an embodiment, the first electronic device may store information about an interface element required in a scenario. In this way, the first electronic device may send, to the second electronic device, the interface element that needs to be displayed by the second electronic device and label information of the interface element. For example, after the first electronic device and the second electronic device are networked, the second electronic device may send, to the first electronic device, information about an interface element required in a first scenario. The second electronic device may send a BLE data packet to the first electronic device, where the BLE data packet may include information about the first scenario and the information about the interface element required in the first scenario. A payload of a service data field in the BLE data packet may include a plurality of bits. The plurality of bits include an extensible bit. The first electronic device and the second electronic device may agree on content of an extensible bit. For example, the second electronic device may encode the information about the first scenario (for example, music) by using GBK, ISO8859-1, Unicode (for example, UTF-8 or UTF-16), or other encoding manners, and may encode the label information of the interface element required in the first scenario by using GBK, ISO8859-1, Unicode (for example, UTF-8 or UTF-16), or other encoding manners, to carry encoded data in one or more extensible bits. After receiving the BLE data packet, the first electronic device may decode the BLE data packet, to learn of the label information of the interface element required by the second electronic device in the first scenario. In this way, after receiving the first indication, the first electronic device may send, to the second electronic device, the interface element required by the second electronic device and the label information of the interface element.

Figure 11:
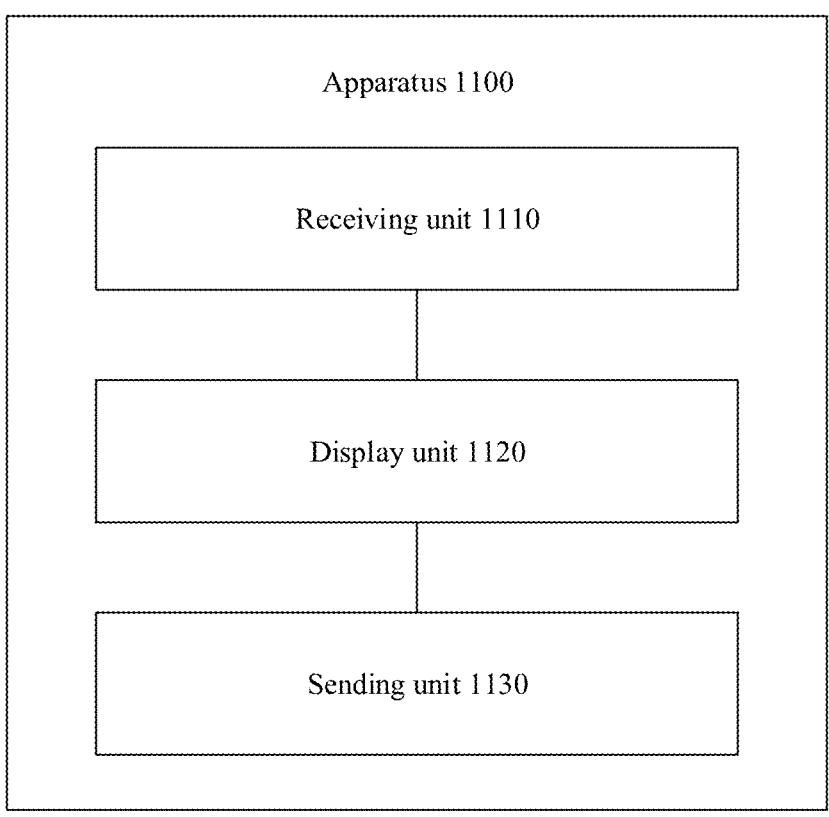
FIG. 11 is a schematic diagram of a structure of an apparatus according to an embodiment of this application.

FIG. 11 is a schematic block diagram of an apparatus 1100 according to an embodiment of this application. The apparatus 1100 may be disposed in the first electronic device in FIG. 10. The apparatus 1100 includes: a receiving unit 1110, configured to receive a first indication; a display unit 1120, configured to display a first interface in response to receiving the first indication; and a sending unit 1130, configured to send first information to a second electronic device, where the first information includes one or more interface elements on the first interface and label information of the one or more interface elements.

Figure 12:
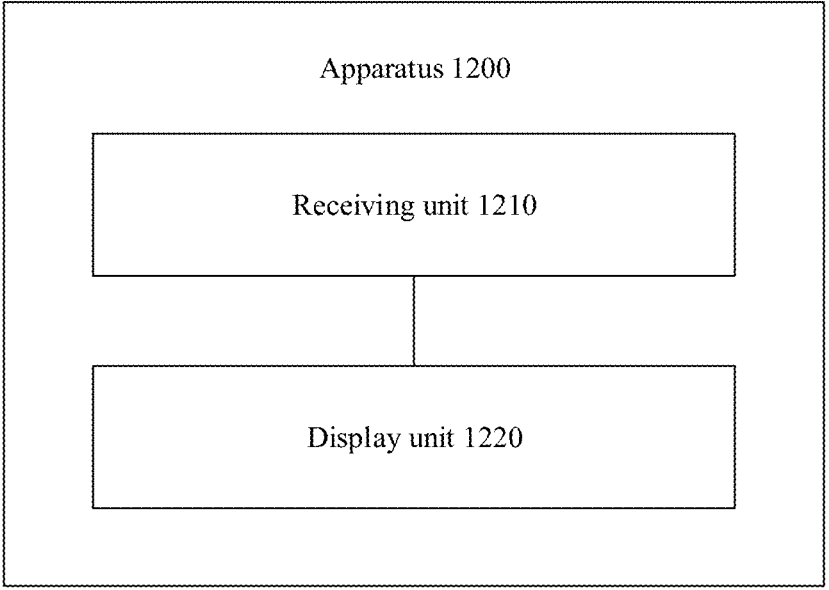
FIG. 12 is another schematic diagram of a structure of an apparatus according to an embodiment of this application.

FIG. 12 is a schematic block diagram of an apparatus 1200 according to an embodiment of this application. The apparatus 1200 may be disposed in the second electronic device in FIG. 10. The apparatus 1200 includes: a receiving unit 1210, configured to receive first information sent by a first electronic device, where the first information includes one or more interface elements on a first interface displayed by the first electronic device and label information of the one or more interface elements; and a display unit 1220, configured to display a second interface based on the label information of the one or more interface elements in response to receiving the label information, where the second interface displays at least part of the one or more interface elements.

Figure 13:
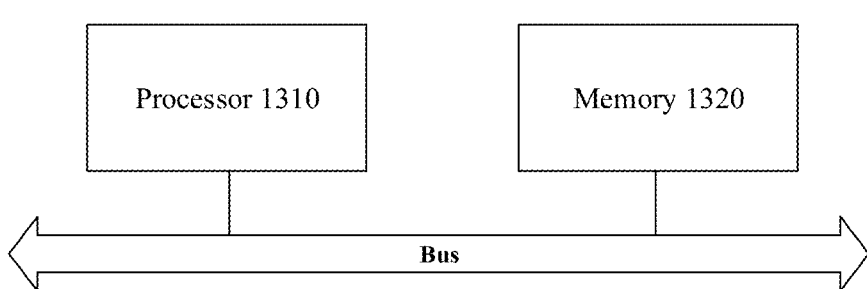
FIG. 13 is another schematic diagram of a structure of an electronic device according to an embodiment of this application.

FIG. 13 is a schematic diagram of a structure of an electronic device 1300 according to an embodiment of this application. As shown in FIG. 13, the electronic device includes one or more processors 1310 and one or more memories 1320. The one or more memories 1320 store one or more computer programs, and the one or more computer programs include instructions. When the instructions are run by the one or more processors 1310, a first electronic device or a second electronic device is enabled to perform the technical solutions in the foregoing embodiments.

An embodiment of this application provides a system, including a first electronic device and a second electronic device. The system is configured to perform the technical solutions in the foregoing embodiments. Implementation principles and technical effects thereof are similar to those of the foregoing method embodiments. Details are not described herein again.

An embodiment of this application provides a computer program product. When the computer program product runs on a first electronic device (or the notebook computer in the foregoing embodiment), the first electronic device is enabled to perform the technical solutions in the foregoing embodiments. Implementation principles and technical effects thereof are similar to those of the foregoing method embodiments. Details are not described herein again.

An embodiment of this application provides a computer program product. When the computer program product runs on a second electronic device (or the mobile phone in the foregoing embodiment), the second electronic device is enabled to perform the technical solutions in the foregoing embodiments. Implementation principles and technical effects thereof are similar to those of the foregoing method embodiments. Details are not described herein again.

An embodiment of this application provides a readable storage medium. The readable storage medium includes instructions. When the instructions are run on a first electronic device (or the notebook computer in the foregoing embodiment), the first electronic device is enabled to perform the technical solutions in the foregoing embodiments. Implementation principles and technical effects thereof are similar. Details are not described herein again.

An embodiment of this application provides a readable storage medium. The readable storage medium includes instructions. When the instructions are run on a second electronic device (or the mobile phone in the foregoing embodiment), the second electronic device is enabled to perform the technical solutions in the foregoing embodiments. Implementation principles and technical effects thereof are similar. Details are not described herein again.

An embodiment of this application provides a chip. The chip is configured to execute instructions. When the chip runs, the technical solutions in the foregoing embodiments are executed. Implementation principles and technical effects thereof are similar. Details are not described herein again.

One of ordinary skilled in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of embodiments of this application.

It may be clearly understood by one of ordinary skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of embodiments of this application essentially, or the part contributing to the current technology, or a part of the technical solutions may be implemented in a form of a software product. The computer software product is stored in a storage medium, and includes several instructions for instructing a computer device (which may be a personal computer, a server, a network device, or the like) to perform all or a part of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of embodiments of this application. Any variation or replacement readily figured out by one of ordinary skilled in the art within the technical scope disclosed in embodiments of this application shall fall within the protection scope of embodiments of this application. Therefore, the protection scope of embodiments of this application shall be subject to the protection scope of the claims.

What is claimed is:

1. A system, comprising:
a first electronic device configured to:
determine that a distance between the first electronic device and a second electronic device is less than a distance between the first electronic device and a third electronic device;
in response to receiving a first indication, display a first interface, add label information to one or more interface elements on the first interface, and send first information to the second electronic device, wherein the first information comprises the one or more interface elements on the first interface and the label information of the one or more interface elements; and
in response to determining that the distance between the first electronic device and the second electronic device is less than or equal to a preset distance, prompt a user to send the one or more interface elements and the label information of the one or more interface elements on the first interface to the second electronic device for display, and
the second electronic device configured to: in response to receiving the first information, display a second interface based on the label information of the one or more interface elements, wherein the second interface displays at least part of the one or more interface elements, and wherein
the first electronic device communicates with the second electronic device through a short-range wireless connection.

2. The system according to claim 1, wherein the second electronic device is configured to display the second interface based on the label information of the one or more interface elements and a first mapping relationship between display areas of the at least part of the interface elements and label information of the at least part of the interface elements.

3. The system according to claim 1, wherein the first electronic device is configured to:
in response to detecting an operation of starting a first application program by a user, display the first interface and send the first information to the second electronic device.

4. The system according to claim 3, wherein the first electronic device is configured to:
in response to detecting the operation of starting the first application program by the user, display the first interface and prompt the user whether to send the one or more interface elements on the first interface to the second electronic device for display; and
in response to detecting an operation of determining to send the one or more interface elements on the first interface to the second electronic device by the user for display, send the first information to the second electronic device.

5. The system according to claim 3, wherein the first electronic device is further configured to:
in response to detecting the operation of starting the first application program by the user, display the first interface and send first indication information to the second electronic device, wherein the first indication information indicates that the first electronic device has started the first application program;

the second electronic device is further configured to:

in response to receiving the first indication information, prompt the user whether to display a display interface of the first application program by using the second electronic device; and in response to detecting an operation of determining to display the display interface of the first application program by the user by using the second electronic device, send first request information to the first electronic device, wherein the first request information requests to display an interface element on the first interface; and the first electronic device is configured to send the first information to the second electronic device in response to receiving the first request information.

6. The system according to claim 1, wherein the second electronic device is further configured to send second request information to the first electronic device in response to detecting an operation of a user, wherein the second request information requests to display an interface element on the first interface; and the first electronic device is configured to: in response to receiving the second request information sent by the second electronic device, display the first interface and send the first information to the second electronic device.

7. The system according to claim 1, wherein the first electronic device is further configured to: before sending the first information to the second electronic device, determine that the distance between the first electronic device and the second electronic device is less than or equal to the preset distance.

8. The system according to claim 1, wherein the at least part of the interface elements comprise a first interface element, the first electronic device is further configured to send second information to the second electronic device in response to an update of the first interface element, wherein the second information comprises the updated first interface element and label information of the first interface element; and the second electronic device is further configured to display the updated first interface element on the second interface in response to receiving the second information.

9. The system according to claim 1, wherein the at least part of the interface elements comprise a second interface element, the second electronic device is further configured to send second indication information to the first electronic device in response to detecting an input of a user on the second interface element, wherein the second indication information indicates that the second electronic device detects the input of the user on the second interface element; and the first electronic device is further configured to perform an operation for the input in response to receiving the second indication information.

10. The system according to claim 9, wherein the first information further comprises information about a scenario corresponding to the first interface;

wherein the first electronic device is further configured to update a third interface element in response to performing the operation, wherein the at least part of the interface elements comprise the third interface element;

the first electronic device is further configured to send third information to the second electronic device, wherein the third information comprises the updated third interface element and label information of the third interface element; and the second electronic device is further configured to display the updated third interface element on the second interface in response to receiving the third information.

11. A first electronic device, comprising:

a processor; and a memory coupled to the processor to store instructions, which when executed by the processor, cause the first electronic device to:

receive a first indication;

determine that a distance between the first electronic device and a second electronic device is less than a distance between the first electronic device and a third electronic device;

in response to receiving the first indication, display a first interface, add label information to one or more interface elements on the first interface, and send first information to the second electronic device, wherein the first electronic device communicates with the second electronic device through a short-range wireless connection, and the first information comprises one or more interface elements on the first interface and label information of the one or more interface elements; and in response to determining that the distance between the first electronic device and the second electronic device is less than or equal to a preset distance, prompt a user to send the one or more interface elements and the label information of the one or more interface elements on the first interface to the second electronic device for display.

12. The first electronic device according to claim 11, wherein the instructions, which when executed by the processor, further cause the first electronic device to:

send information about a first mapping relationship to the second electronic device, wherein the first mapping relationship is between a display area of an interface element and label information of the interface element.

13. The first electronic device according to claim 11, wherein the receive the first indication comprises:

detect an operation of starting a first application program by a user.

14. The first electronic device according to claim 13, wherein the display the first interface in response to receiving the first indication comprises:

in response to detecting the operation of starting the first application program by the user, display the first interface and prompting the user whether to send the one or more interface elements on the first interface to the second electronic device for display; and in response to detecting an operation of determining to send the one or more interface elements on the first interface to the second electronic device by the user for display, send the first information to the second electronic device.

15. The first electronic device according to claim 13, wherein the send the first information to the second electronic device in response to receiving the first indication comprises:

receive first request information sent by the second electronic device, wherein the first request information requests to display an interface element on the first interface; and send the first information to the second electronic device in response to receiving the first request information.

16. The first electronic device according to claim 11, wherein the instructions, which when executed by the processor, further cause the first electronic device to:

before send the first information to the second electronic device, determine that a distance between the first electronic device and the second electronic device is less than or equal to a preset distance.

17. The first electronic device according to claim 11, wherein the one or more interface elements comprise a first interface element, and wherein the instructions, which when executed by the processor, further cause the first electronic device to:

send second information to the second electronic device in response to an update of the first interface element, wherein the second information comprises the updated first interface element and label information of the first interface element.

18. The first electronic device according to claim 11, wherein the one or more interface elements comprise a second interface element, and wherein the instructions, which when executed by the processor, further cause the first electronic device to:

receive second indication information sent by the second electronic device, wherein the second indication information indicates that the second electronic device detects an input of the user on the second interface element; and perform an operation for the input in response to receiving the second indication information.

19. The first electronic device according to claim 18, wherein the instructions, which when executed by the processor, further cause the first electronic device to:

update a third interface element in response to performing the operation, wherein the one or more interface elements comprise the third interface element; and send third information to the second electronic device, wherein the third information comprises the updated third interface element and label information of the third interface element.

20. A second electronic device, comprising:

a processor; and a memory coupled to the processor to store instructions, which when executed by the processor, cause the second electronic device to:

determine that a distance between a first electronic device and the second electronic device is less than a distance between the first electronic device and a third electronic device;

receive first information sent by the first electronic device, wherein the second electronic device communicates with the first electronic device through a short-range wireless connection, wherein in response to receiving a first indication, the first electronic device displays a first interface, add label information to one or more interface elements on the first interface, and send first information to the second electronic device, and the first information comprises the one or more interface elements on the first interface displayed by the first electronic device and the label information of the one or more interface elements; and in response to determining that the distance between the first electronic device and the second electronic device is less than or equal to a preset distance, prompt a user to send the one or more interface elements and the label information of the one or more interface elements on the first interface to the second electronic device for display; and display a second interface based on the label information of the one or more interface elements in response to receiving the label information, wherein the second interface displays at least part of the one or more interface elements.

* * * * *